(12) United States Patent
Miyao et al.

(10) Patent No.: US 9,522,391 B2
(45) Date of Patent: Dec. 20, 2016

(54) CO-SELECTIVE METHANATION CATALYST

(71) Applicant: University of Yamanashi, Kofu-shi, Yamanashi (JP)

(72) Inventors: Toshihiro Miyao, Kofu (JP); Kazutoshi Higashiyama, Kofu (JP); Weihua Shen, Kofu (JP); Hisao Yamashita, Kofu (JP); Noboru Hashimoto, Kofu (JP); Shigehito Deki, Kofu (JP); Masahiro Watanabe, Kofu (JP)

(73) Assignee: University of Yamanashi, Kofu-shi, Yamanashi (JP)

( * ) Notice: Subject to any disclaimer, the term of this patent is extended or adjusted under 35 U.S.C. 154(b) by 0 days.

(21) Appl. No.: 14/425,589

(22) PCT Filed: Aug. 26, 2013

(86) PCT No.: PCT/JP2013/072762
§ 371 (c)(1),
(2) Date: Mar. 3, 2015

(87) PCT Pub. No.: WO2014/038426
PCT Pub. Date: Mar. 13, 2014

(65) Prior Publication Data
US 2015/0246347 A1 Sep. 3, 2015

(30) Foreign Application Priority Data

Sep. 4, 2012 (JP) .................................. 2012-194476

(51) Int. Cl.
*B01J 21/00* (2006.01)
*B01J 21/04* (2006.01)
(Continued)

(52) U.S. Cl.
CPC ............... *B01J 29/76* (2013.01); *B01J 21/063* (2013.01); *B01J 21/08* (2013.01); *B01J 23/755* (2013.01);
(Continued)

(58) Field of Classification Search
CPC ............. B01J 21/06; B01J 21/08; B01J 23/10; B01J 23/745; B01J 23/755
(Continued)

(56) References Cited

U.S. PATENT DOCUMENTS 4,568,448 A 2/1986 Angevine
5,330,945 A 7/1994 Beckmeyer
(Continued)

FOREIGN PATENT DOCUMENTS

EP 0 945 178 A1 9/1999
GB 2 077 613 A 12/1981
(Continued)

OTHER PUBLICATIONS

Partial Supplementary European Search Report mailed Sep. 14, 2015, issued in corresponding European Application No. 13835852.8, filed Aug. 26, 2013, 9 pages.
(Continued)

*Primary Examiner* — Cam N. Nguyen
(74) *Attorney, Agent, or Firm* — Christensen O'Connor Johnson Kindness PLLC

(57) ABSTRACT

The first object is to increase the life of a selective CO methanation catalyst, and the second object is to enhance the CO removal rate of a selective CO methanation catalyst to reduce the outlet CO concentration in a wide temperature range. Provided a selective CO methanation catalyst including a supported metal catalyst which selectively methanizes CO in a hydrogen-rich gas containing CO and $CO_2$ and a coating layer which covers a surface of the supported metal
(Continued)

catalyst, has many pores, and is configured to reduce a CO concentration on the surface of the supported metal catalyst.

20 Claims, 18 Drawing Sheets

(51) Int. Cl.

| | |
|---|---|
| B01J 23/00 | (2006.01) |
| B01J 23/02 | (2006.01) |
| B01J 23/08 | (2006.01) |
| B01J 23/10 | (2006.01) |
| B01J 23/40 | (2006.01) |
| B01J 23/42 | (2006.01) |
| B01J 23/56 | (2006.01) |
| B01J 23/70 | (2006.01) |
| B01J 23/72 | (2006.01) |
| B01J 23/74 | (2006.01) |
| B01J 29/76 | (2006.01) |
| B01J 23/755 | (2006.01) |
| B01J 23/78 | (2006.01) |
| C01B 37/02 | (2006.01) |
| C01B 3/58 | (2006.01) |
| C10L 3/08 | (2006.01) |
| B01J 37/03 | (2006.01) |
| B01J 23/847 | (2006.01) |
| B01J 29/03 | (2006.01) |
| B01J 35/00 | (2006.01) |
| B01J 21/08 | (2006.01) |
| B01J 35/10 | (2006.01) |
| H01M 8/06 | (2016.01) |
| B01J 35/04 | (2006.01) |
| B01J 21/06 | (2006.01) |
| B01J 37/04 | (2006.01) |

(52) U.S. Cl.
CPC ............. *B01J 23/78* (2013.01); *B01J 23/8472* (2013.01); *B01J 29/0308* (2013.01); *B01J 29/0333* (2013.01); *B01J 35/0006* (2013.01); *B01J 35/04* (2013.01); *B01J 35/1014* (2013.01); *B01J 35/1061* (2013.01); *B01J 37/03* (2013.01); *C01B 3/586* (2013.01); *C01B 37/02* (2013.01); *C10L 3/08* (2013.01); *H01M 8/0668* (2013.01); *B01J 37/04* (2013.01); *C01B 2203/0233* (2013.01); *C01B 2203/047* (2013.01); *C01B 2203/0445* (2013.01); *C01B 2203/066* (2013.01); *C01B 2203/1258* (2013.01); *H01M 8/0612* (2013.01); *Y02E 60/50* (2013.01)

(58) Field of Classification Search
USPC ....... 502/242, 244, 245, 247, 252, 258, 259, 502/302–304, 314–316, 326, 327, 331, 502/332, 335–338, 349–351, 355, 439
See application file for complete search history.

(56) References Cited

U.S. PATENT DOCUMENTS

| | | | |
|---|---|---|---|
| 5,597,771 A | 1/1997 | Hu | |
| 7,569,510 B2* | 8/2009 | Deevi | ................ B01J 23/52 131/331 |
| 7,897,538 B2* | 3/2011 | Landau | ............... B01J 20/02 502/407 |
| 8,097,555 B2* | 1/2012 | Costa | ................ B01J 23/6527 502/242 |
| 8,222,173 B2* | 7/2012 | Yamashita | ............... B01J 23/24 502/240 |
| 8,415,267 B2* | 4/2013 | Lee | .................. B01J 21/063 502/240 |
| 8,455,390 B2* | 6/2013 | Kikuchi | ............... B01D 53/945 502/240 |
| 8,614,161 B2* | 12/2013 | Lee | .................. B01J 21/08 502/240 |
| 8,633,131 B2* | 1/2014 | Lee | .................. B01J 21/04 429/400 |
| 2002/0086796 A1 | 7/2002 | Eckardt | |
| 2004/0048114 A1 | 3/2004 | Shore | |
| 2012/0063963 A1 | 3/2012 | Watanabe | |
| 2013/0071318 A1 | 3/2013 | Higashiyama | |

FOREIGN PATENT DOCUMENTS

| | | |
|---|---|---|
| JP | 57-15834 A | 1/1982 |
| JP | 2005-238131 A | 9/2005 |
| WO | 2010/122855 A1 | 10/2010 |
| WO | 2011/142481 A1 | 11/2011 |

OTHER PUBLICATIONS

Andersson, M.P., et al., "Toward Computational Screening in Heterogeneous Catalysis: Pareto-Optimal Methanation Catalysts," Journal of Catalysis 239(2):501-506, Apr. 2006.

Du, G., et al., "Methanation of Carbon Dioxide on Ni-Incorporated MCM-41 Catalysts: The Influence of Catalyst Pretreatment and Study of Steady-State Reaction," Journal of Catalysis 249(2):370-379, Jul. 2007.

Extended European Search Report mailed Dec. 21, 2015, issued in corresponding European Application No. 13835852.8, filed Aug. 26, 2013, 24 pages.

Kustov, A.L., et al., "CO Methanation Over Supported Bimetallic Ni—Fe Catalysts: From Computational Studies Towards Catalyst Optimization," Applied Catalysis A: General 320:98-104, Mar. 2007.

International Search Report mailed Dec. 3, 2013, issued in International Application No. PCT/JP2013/072762, filed Aug. 26, 2013, 8 pages.

\* cited by examiner

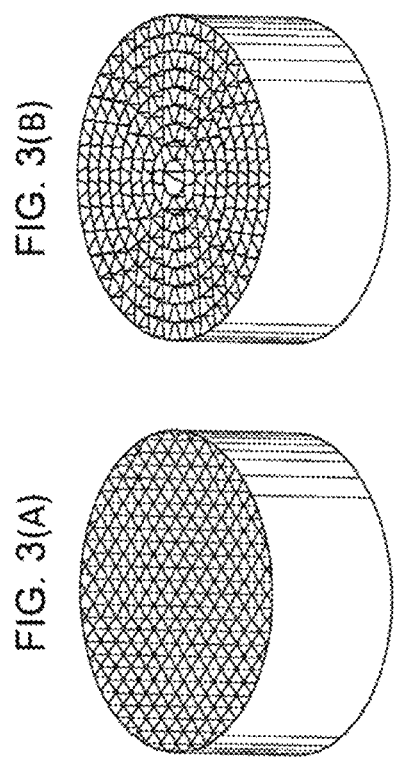
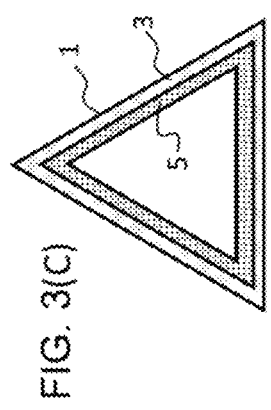

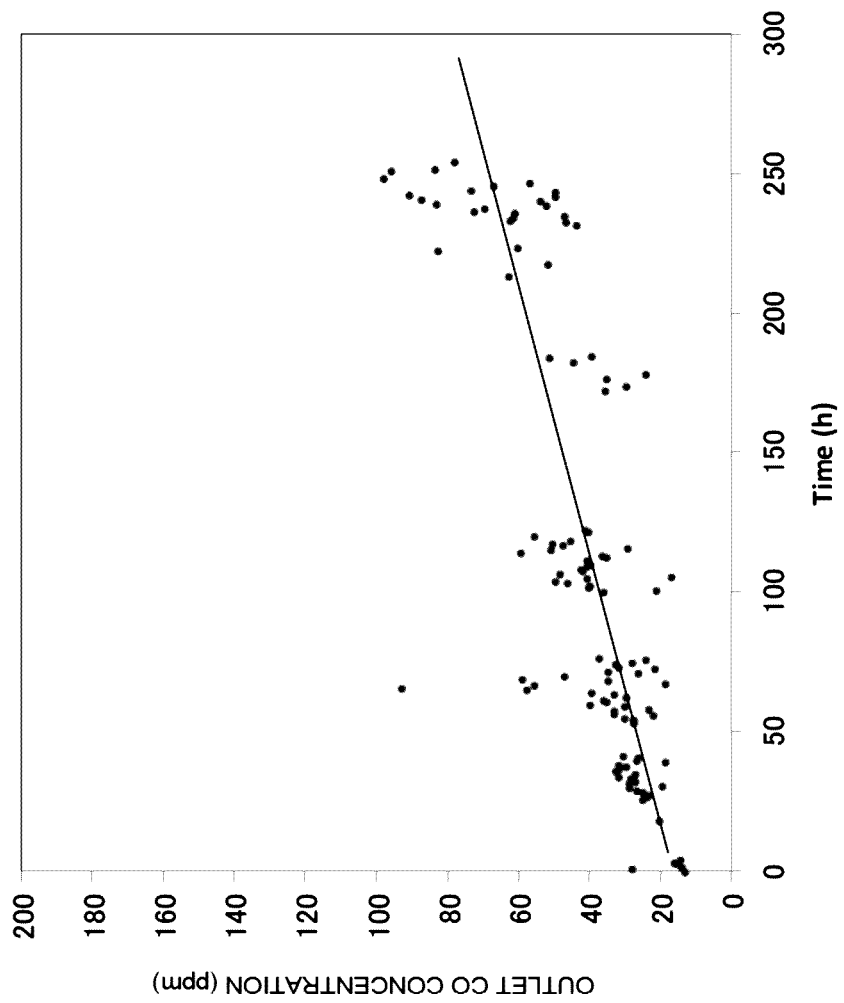

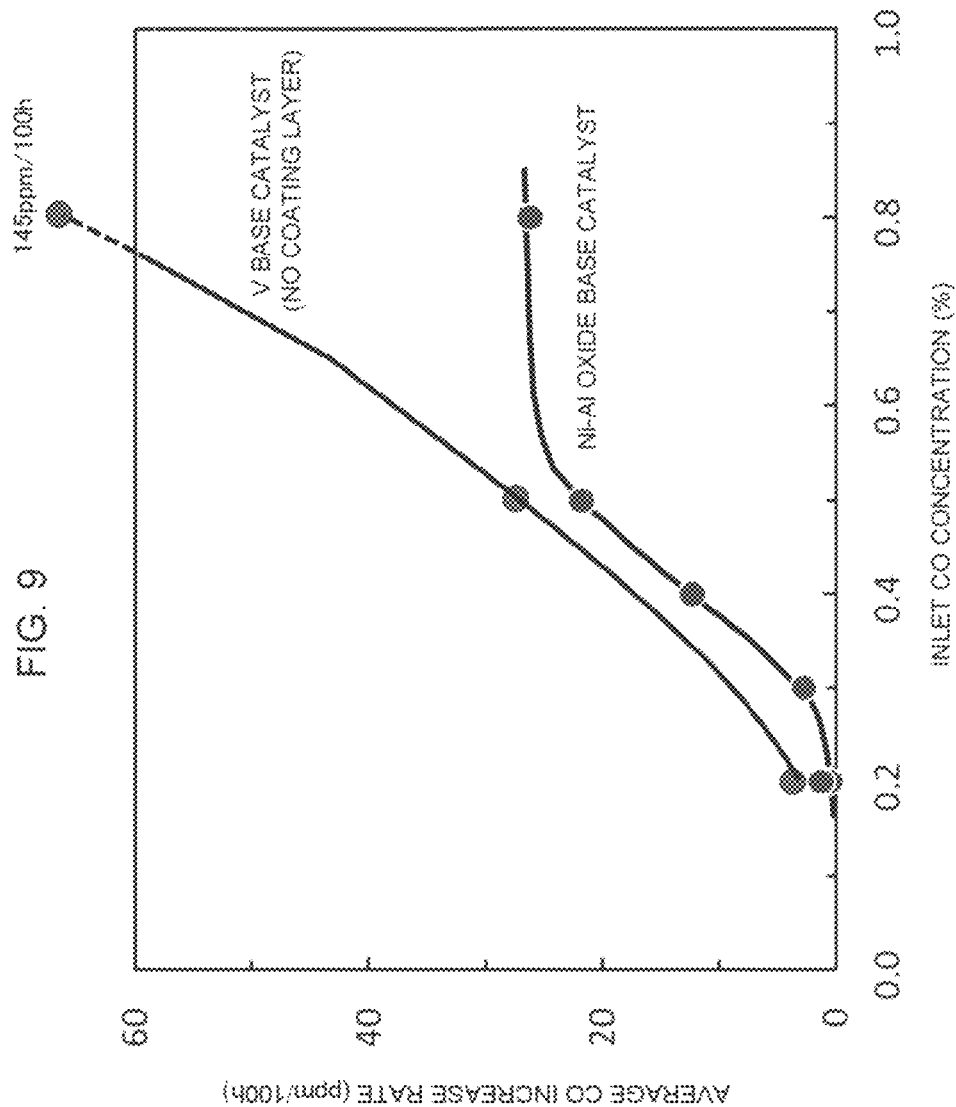

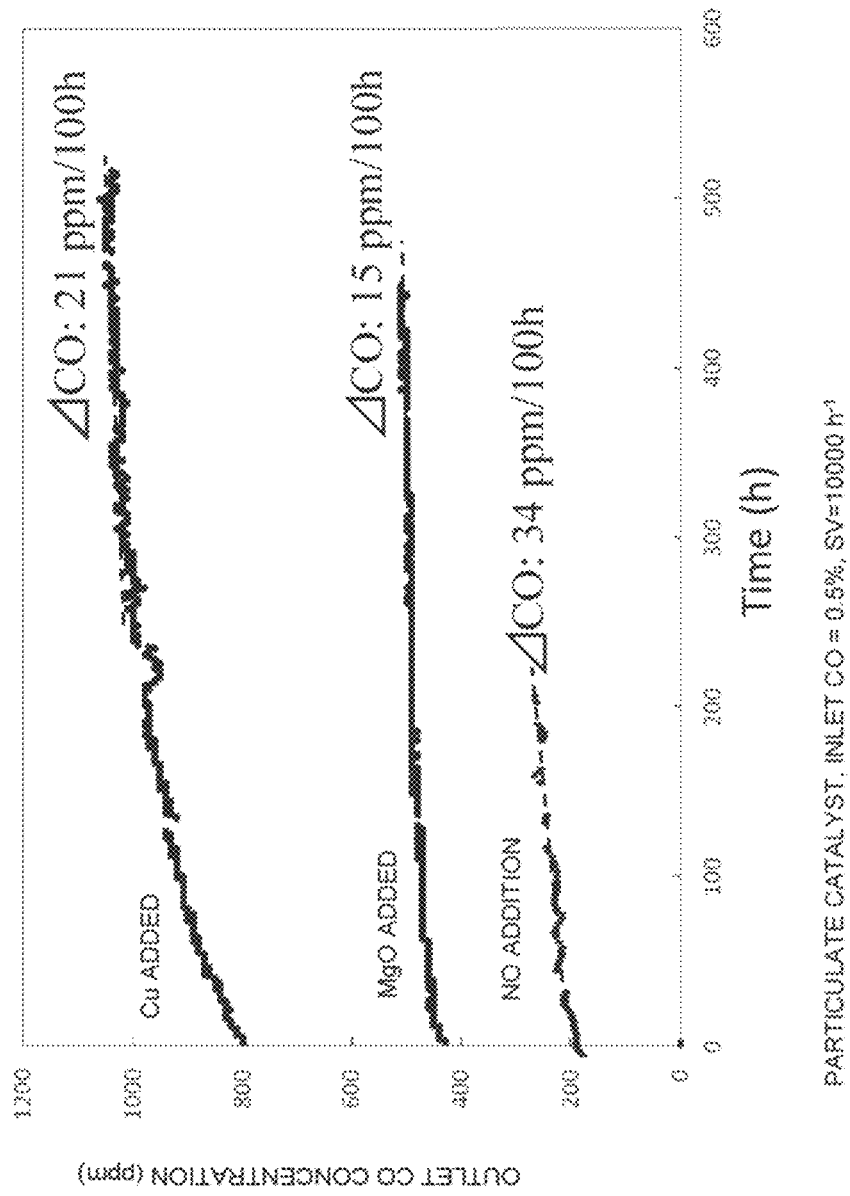

MICROPHOTOGRAPHS AND XRD PATTERNS OF Ni-ADDED Ti-MCM CATALYST
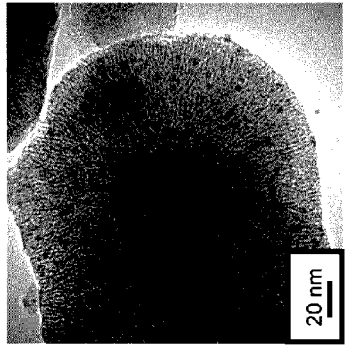
FIG. 12(a) BEFORE REDUCTION
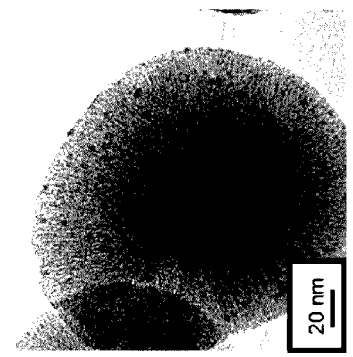
FIG. 12(b) AFTER REDUCTION
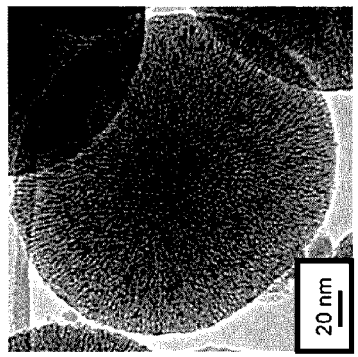
FIG. 12(c) AFTER LONG-TERM TEST
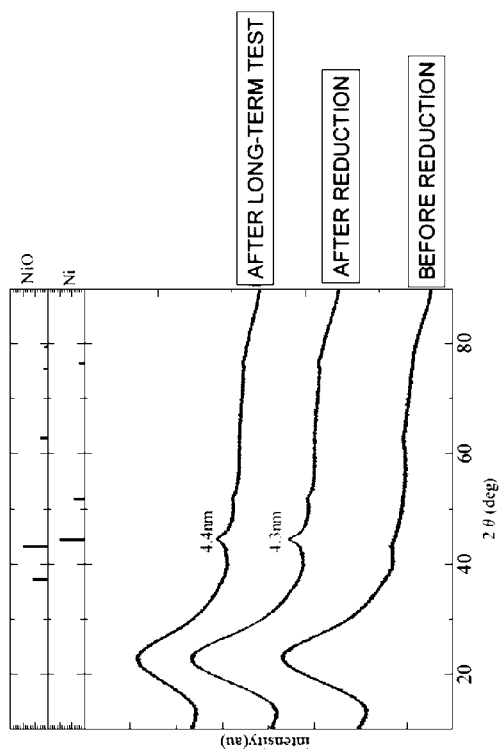
FIG. 12(d) XRD PATTERN FIG. 15 MICROPHOTOGRAPH OF Ti-MCM LAYER (ATOMIC RATIO Ti/Si=0.1)

<AFTER FIRING>  <AFTER REDUCTION, STEAM TREATMENT>

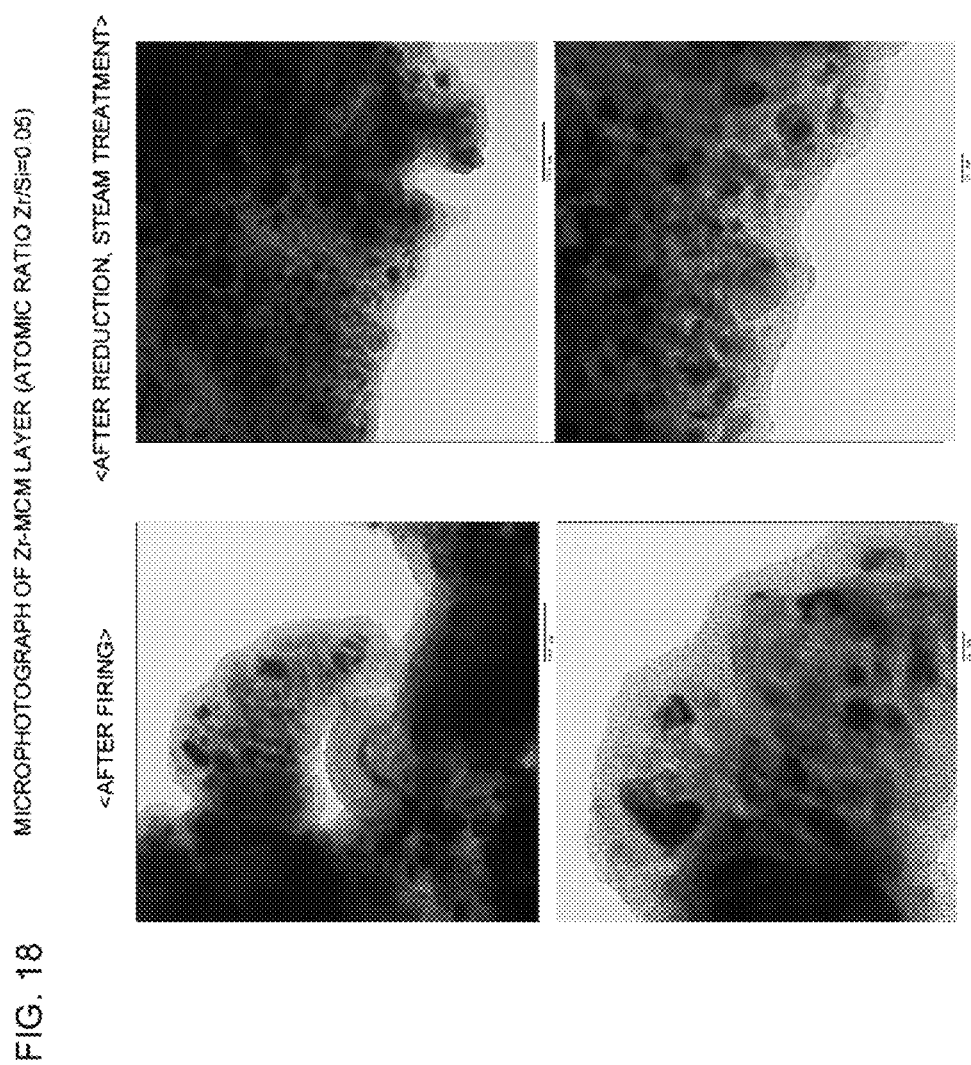

CO-SELECTIVE METHANATION CATALYST

TECHNICAL FIELD

The present invention relates to a selective CO methanation catalyst which is widely applicable to the process of removing CO in a fuel reformer for home-use polymer electrolyte fuel cells and the catalytic reaction process involving activity degradation due to accumulation of reactants.

BACKGROUND ART

Polymer electrolyte fuel cells operate at low temperatures around 80° C. Accordingly, if a hydrogen-rich gas serving as fuel contains a certain or higher level of carbon monoxide, the platinum anode catalyst may be CO-poisoned, which may reduce the power generation performance and ultimately disable the fuel cell from generating power.

Home-use polymer electrolyte fuel cell power generation systems convert a town gas, LP gas, kerosene, or the like into a hydrogen-rich gas using a fuel reformer and use this hydrogen-rich gas as fuel. To avoid CO poisoning as described above, these systems preferably always control the CO concentration of the fuel cell anode inlet gas to 10 ppm or less. In the final stage of the fuel reforming process, many of the actual systems use a selective CO oxidation catalyst, which mixes air into the generated gas and oxidizes CO in the gas into $CO_2$.

$$CO + \tfrac{1}{2}O_2 = CO_2 \quad \text{Reaction Formula 1}$$

However, as shown in Reaction Formula 1, such a catalyst must usually take in air from outside. Accordingly, the fuel reformer must be provided with an air blower and a control system thereof, and a complicated gas mixing structure for uniformly mixing supplied air into the reaction gas.

Currently, selective CO methanation catalysts are attracting attention as a new approach to replace selective CO oxidation catalysts (e.g., Patent Literature 1 and 2).

Patent Literature 1 discloses a selective CO methanation catalyst prepared by impregnating, with ruthenium salt, a nonstoichiometric Ni—Al complex oxide precursor prepared by plasma spray and performing reduction treatment. This selective CO methanation catalyst can selectively methanize CO even at high temperatures, at which a $CO_2$ methanation reaction and a reverse water-gas shift reaction proceed more dominantly than a CO methanation reaction over traditional catalysts.

Patent Literature 2 discloses a selective CO methanation catalyst whose active component adsorbs or couples with at least one selected from halogen, inorganic acid, and metal oxygen acid serving as carbon dioxide reaction inhibitors. This selective CO methanation catalyst is excellent at selecting a CO methanation reaction

PRIOR ART LITERATURE

Patent Literature

[Patent Literature 1] WO2010/122855
[Patent Literature 2] WO2010/142481

SUMMARY OF INVENTION

Technical Problem

The catalysts disclosed in Patent Literature 1 and 2 are excellent at selecting a CO methanation reaction. However, when the inventors used these catalysts in a study on the commercialization thereof, they found that these catalysts tended to degrade (the catalytic activity tended to degrade), particularly when the superficial velocity of the reaction gas was high. Further, when a selective CO oxidation catalyst was used, the CO concentration of the outlet gas (hereafter referred to as the "outlet CO concentration") was easy to control to 10 ppm or less; on the other hand, when those selective CO methanation catalysts were used, the outlet CO concentration could be controlled to 10 ppm or less only in a very narrow temperature range. Accordingly, those selective CO methanation catalysts are not easy to commercialize as they are.

The present invention has been made in view of the foregoing. The first object thereof is to increase the life of a selective CO methanation catalyst, and the second object is to increase the CO removal rate of a selective CO methanation catalyst to reduce the outlet CO concentration in a wide temperature range.

Solution to Problem

A first aspect of the present invention provides a selective CO methanation catalyst including a supported metal catalyst which selectively methanizes CO in a hydrogen-rich gas containing CO and $CO_2$ and a coating layer which covers a surface of the supported metal catalyst, has many pores, and is configured to reduce a CO concentration on the surface of the supported metal catalyst.

To identify the cause of the degradation of the selective CO methanation catalysts, the inventors analyzed the degraded catalysts, and then found that the amount of carbonaceous species accumulated on the catalyst surface increased with the passage of the reaction time and thus the reaction surface area decreased, resulting in the degradation. Subsequently, to investigate the cause of such carbonaceous species accumulation, the inventors investigated the dependency of the degradation velocity of the catalysts on the CO concentration, and then found that the degradation velocity increased as the CO concentration increased and that CO concentrations not higher than a certain threshold significantly reduced the degradation velocity of the catalysts. Based on these findings, the inventors coated the surface of a supported metal catalyst with a coating layer having many pores and configured to reduce the CO concentration on the surface of the supported metal catalyst. They then found that the life of the catalyst dramatically increased, and thus completed the present invention.

A second aspect of the present invention provides a method for manufacturing a selective CO methanation catalyst. The method includes a step of mixing, with water, a supported metal catalyst which selectively methanizes CO in a hydrogen-rich gas containing CO and $CO_2$ and a step of calcination for (calcining) the solid content of the supported metal catalyst mixed with the water.

On the other hand, the inventors predicted that the formation of the coating layer on the supported metal catalyst would reduce the catalytic activity due to the diffusion resistance despite of increasing the life and thus would increase the outlet CO concentration. The inventors then measured the outlet CO concentration when there was used a catalyst having the coating layer formed on the supported metal catalyst. Unexpectedly, they obtained a dramatically low value, which is $\tfrac{1}{10}$ or less that of the catalyst which was yet to be coated. The inventors then intensively investigated the cause of such a surprising result and found that the formation of the coating layer was not essential to increasing the activity but rather the step of mixing the supported metal catalyst with water and the step of calcination for the solid content of the mixed solution in the coating layer formation process were essential to increasing the activity. Thus, they completed the present invention. Although the reason why these steps dramatically increase the activity is not clearly known, the inventors assume that one or more of the following factors form the activity increase mechanism: (1) a change in the composition of the metal surface; (2) reforming of the metal surface (a change in roughness or the like); (3) a change in the exposed crystal surface of the metal surface; and (4) a change in the mixture state of the additive (vanadium, etc.) and Ni. However, the inventors cannot deny the possibility that other factors may have increased the activity of the catalyst. Accordingly, the scope of the present invention is not limited to the mechanism described above.

BRIEF DESCRIPTION OF THE DRAWINGS

FIGS. 3(A) and 3(B) are perspective views each showing an example of a honeycomb substrate, and FIG. 3(C) is a plan view of one cell of a honeycomb substrate.

FIG. 7 is a graph showing the result of the long-term test on the catalyst of Preparation Example 5.

FIG. 9 is a graph showing the dependence on the CO concentration.

FIG. 10 is a graph showing the results of long-term tests when Cu or MgO is added to a coating layer.

FIGS. 12(a) to 12(c) show microphotographs of a Ti-MCM catalyst, in which FIG. 12(a) shows the state before reduction, FIG. 12(b) shows the state after the reduction, and FIG. 12(c) shows the state after a long-term test, and FIG. 12(d) shows XRD patterns of the Ti-MCM catalyst before the reduction, after the reduction, and after the long-term test.

FIG. 18 shows microphotographs about a Zr-MCM layer (atomic ratio Zr/Si=0.05) before and after steam treatment.

DESCRIPTION OF EMBODIMENTS

Now, an embodiment of the present invention will be described.

1. Configuration of Entire System

Figure 2:
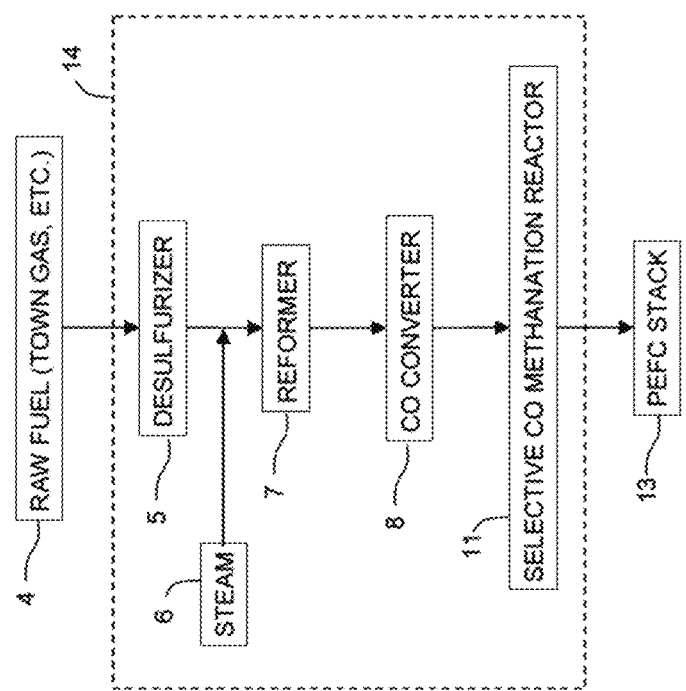
FIG. 2 is a block diagram showing a schematic configuration of an entire hydrogen generation system.

FIG. 2 shows the flow of the process of generating, from raw fuel (town gas, etc.), a high-concentration hydrogen gas to be supplied to a fuel cell [e.g., polymer electrolyte fuel cell (PEFC stack)] and refining the hydrogen gas, and a schematic configuration of the entire system. A portion surrounded by a broken line corresponds to fuel reforming equipment (fuel processor) 14. A raw fuel supplied from a raw fuel supply system 4 passes through catalyst layers in the fuel reforming equipment 14. In this process, reforming and CO removal are performed (10 ppm or less) to give a high-concentration hydrogen gas (reformed gas: $H_2$ of about 75%, $CO_2$ of about 20%).

First, the sulfur content of the raw fuel is removed using a desulfurizer 5, then hydrogen ($H_2$) and carbon monoxide (CO) are generated through a reforming reaction in a reformer 7 including a reforming catalyst layer (steam reforming using steam from a steam generator 6), and then CO is removed in a CO converter 8 including a CO converter catalyst layer.

Then, the resulting gas ($H_2$, $CO_2$, etc.) containing about 0.5 to 1.0% of CO is passed through a selective CO methanation reactor 11 including a selective CO methanation catalyst layer using a selective CO methanation catalyst of the present invention. In this process, the gas is reformed into a high-concentration $H_2$ gas having a CO concentration of 10 ppm or less (reformed gas), and then supplied to a PEFC stack 13.

The selective CO methanation catalyst is preferably used in the form of a pellet-type catalyst. A selective CO methanation catalyst applied to a honeycomb substrate may be used. FIGS. 3(A) and 3(B) each show an example of a honeycomb substrate. Specifically, FIG. 3(A) shows an example of a cordierite honeycomb substrate, and FIG. 3(B) shows an example of a metal honeycomb substrate. In any case, a tubular body (cylinder, square tube, etc.) has many partition plates (partition walls) disposed along the length direction therein, the partition plates cross each other vertically, horizontally, diagonally, or the partition plates are disposed to form wave or other shapes, and the gaps among adjacent partition plates form gas passages. The selective CO methanation catalyst is applied to all the surfaces of the partition plates. The sectional shape of the gas passages (gas channels, cells) is not limited to a hexagonal shape and can be rectangular, sinusoidal, or other shapes. In this specification, a honeycomb structure having such gas passages is referred to simply as a honeycomb or as a honeycomb substrate.

Examples of the method for applying the selective CO methanation catalyst to a honeycomb substrate include a method of applying a powder having a coating layer formed thereon to a honeycomb substrate and a method of applying a catalyst powder to a honeycomb substrate 1 to form a catalyst layer 3 and forming a coating layer 5 on the catalyst layer 3, as shown in FIG. 3(C).

2. Configuration of Selective CO Methanation Catalyst

The selective CO methanation catalyst of an embodiment of the present invention includes a supported metal catalyst which selectively methanizes CO in a hydrogen-rich gas containing CO and $CO_2$ and a coating layer which covers a surface of the supported metal catalyst, has many pores, and is configured to reduce the CO concentration on the surface of the supported metal catalyst.

This catalyst is characterized in that a coating layer having a CO concentration reduction function is formed on a supported metal catalyst having a selective CO methanation function as described in Patent Literature 1 and 2. As described above, the reaction gas flowing into the selective CO methanation reactor 11 usually contains about 0.5 to 1.0% of CO. If the supported metal catalyst is exposed to CO having such a concentration for a long time, carbonaceous species gradually deposit on the supported metal catalyst and gradually reduce the activity thereof. According to the present embodiment, on the other hand, the coating layer formed on the supported metal catalyst makes the CO concentration on the supported metal catalyst lower than that in the reaction gas, reducing degradation of the supported metal catalyst. The experiment conducted by the inventors revealed that the degradation velocity of the supported metal catalyst became higher as the CO concentration increased and that when CO concentrations not higher than 0.2% significantly reduced the degradation velocity of the supported metal catalyst. Accordingly, it is preferred to form a coating layer on the supported metal catalyst so that the CO concentration on the supported metal catalyst is reduced to 0.2% or less.

Figure 1:
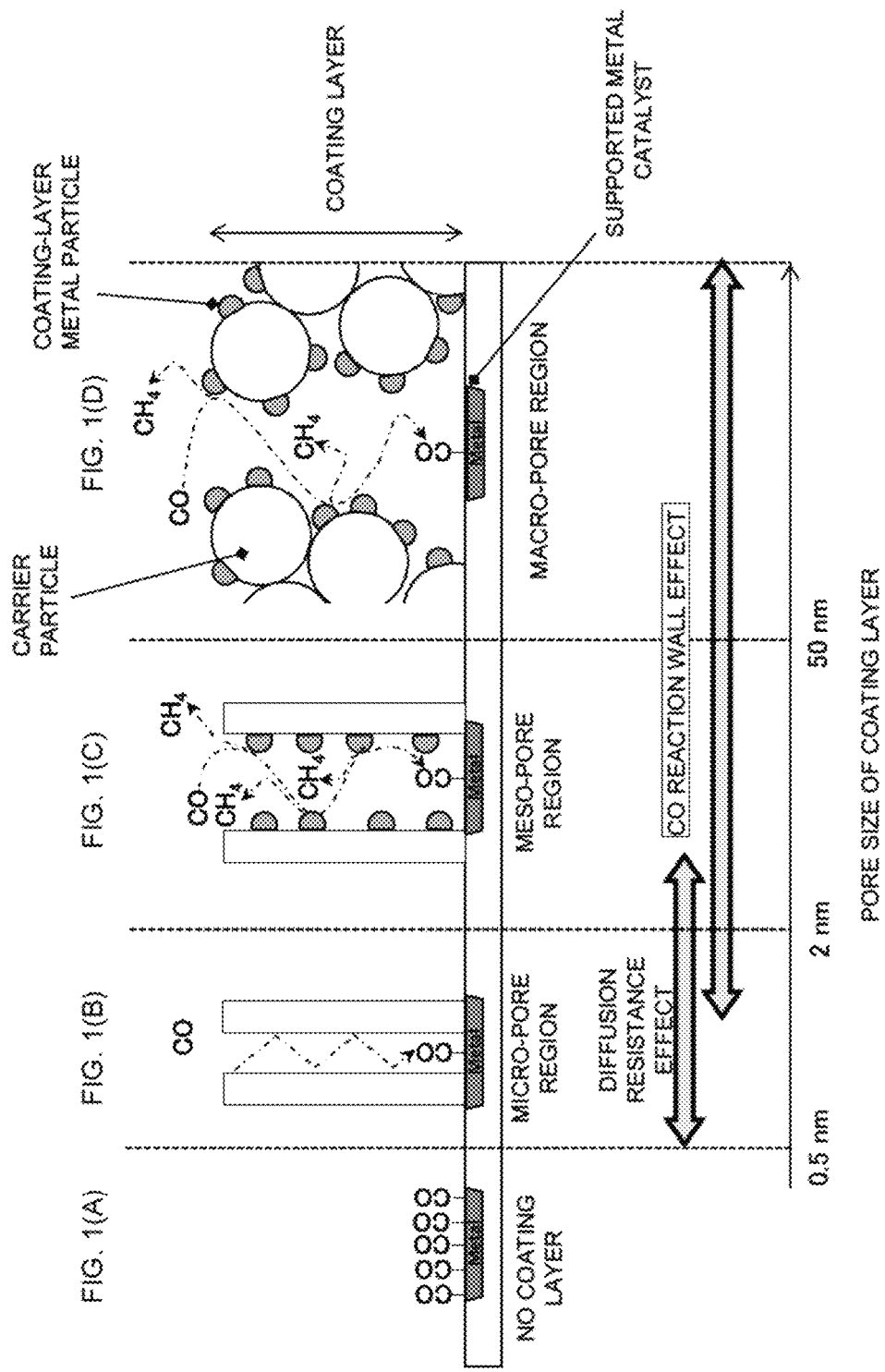
FIGS. 1(A) to 1(D) are diagrams showing a mechanism in which a CO concentration gradient is formed in a coating layer formed on a supported metal catalyst.

Referring now to FIG. 1, there will be described the mechanism in which the coating layer reduces the CO concentration on the supported metal catalyst. While the inventors assume that such a CO concentration reduction is achieved by one of mechanisms shown in FIGS. 1(B) to 1(D) or combinations thereof, the present invention is not limited to these mechanisms. Any other mechanisms which reduce the CO concentration are also included in the scope of the present invention.

FIG. 1(A) shows a case where no coating layer is formed on the supported metal catalyst. Since the supported metal catalyst surface directly contacts the reaction gas containing high-concentration CO, the catalyst degrades faster as the CO concentration in the reaction gas increases. FIG. 1(B) shows a case where the coating layer has pores having diameters of e.g., about 0.5 to 2 nm (hereafter referred to as "micro-pores"). In the micro-pores, the diffusion velocity of CO is very low, and the velocity of CO supply onto the supported metal catalyst surface is lower than the velocity of CO consumption by methanation on the supported metal catalyst surface. Accordingly, the CO concentration becomes lower as the supported metal catalyst surface is approached, forming a CO concentration gradient in the coating layer.

The diffusion coefficient of molecules in the micro-pores is represented by the following formula.

$$Dk=(\tfrac{1}{3})vd$$

where Dk represents the Knudsen diffusion coefficient, v represents the moving speed of the molecules, and d represents the diameter of the micro-pores. Since the diffusion coefficient is proportional to the micro-pore diameter, the CO diffusion velocity can be made lower than the CO adsorption velocity if the micro-pore diameter is sufficiently small. The CO concentration on the supported metal catalyst surface becomes lower as the micro-pore diameter is reduced or the thickness of the coating layer is increased. Accordingly, the micro-pore diameter and the coating layer thickness are set appropriate so that the CO concentration on the supported metal catalyst surface becomes the desired value.

FIG. 1(C) shows a case where the coating layer has pores having diameters of e.g., about 2 to 50 nm (hereafter referred to as "meso-pores"). Typically, the CO diffusion velocity in the meso-pores is higher than the velocity of the CO consumption by methanation on the supported metal catalyst surface. This makes it difficult for CO consumption by methanation to singly form a CO concentration gradient in the coating layer. For this reason, in FIG. 1(C), a coating-layer metal having a CO methanation function is supported on the wall surfaces of the meso-pores so that CO is methanized in the meso-pores. Thus, a CO concentration gradient is formed in the coating layer such that the CO concentration is reduced as the supported metal catalyst surface is approached. The coating-layer metal supported in the meso-pores may be the same as the active metal of the supported metal catalyst or different therefrom. An advantage obtained by using the same metal as both the coating-layer metal in the meso-pores and the active metal of the supported metal catalyst is as follows: by temporarily dissolving the active metal supported on the supported metal catalyst as a complex and then depositing it in the meso-pores, the coating layer-metal can be supported in the meso-pores and thus the manufacturing process can be simplified.

On the other hand, if different metals are used as the coating-layer metal in the meso-pores and the active metal of the supported metal catalyst, for example, a metal having high CO selectivity may be selected as the active metal of the supported metal catalyst, and a metal having a high resistance to poisoning by high-concentration CO may be selected as the coating-layer metal in the meso-pores. The reason is as follows: typically, the CO selectivity decreases as the CO concentration decreases and therefore it is important that the CO selectivity is high on the supported metal catalyst surface, where the CO concentration is low; on the other hand, the poisoning resistance is more important than the CO selectivity in the coating layer (particularly, the area close to the coating layer surface), where the CO concentration is relatively high. The size of the meso-pores, the type and amount of the supported coating-layer metal in the meso-pores, and the coating layer thickness, and the like are set as appropriate so that the CO concentration on the supported metal catalyst surface becomes the desired value.

The coating-layer metal is, for example, a metal containing Ni and is preferably a metal containing Ni and at least one modified metal selected from Cu, Mg, and Fe. Containing such a modified metal makes the catalytic activity of the coating-layer metal less likely to be degraded. Fe is particularly preferable as the modified metal. Use of a metal containing Ni and Fe as the coating-layer metal significantly delays degradation of the catalytic activity of the coating-layer metal. The atomic ratio of the modified metal to Ni is, for example, 0.01 to 1, preferably 0.05 to 0.5. More specifically, this atomic ratio is, for example, 0.01, 0.02, 0.03, 0.04, 0.05, 0.06, 0.07, 0.08, 0.09, 0.1, 0.15, 0.2, 0.3, 0.4, 0.5, 0.6, 0.7, 0.8, 0.9, or 1, or may be between any two of the values presented.

While the pores are classified into micro-pores and meso-pores in accordance with the sizes of the pores for the convenience of description, the boundary between both kinds of pores varies under various conditions. The coating layer may also have both micro-pores and meso-pores. That is, there may be a case where a combination of the concentration gradient based on the diffusion resistance and the concentration gradient based on the methanation by the coating-layer metal in the meso-pores reduces the CO concentration on the supported metal catalyst surface. Further, the reaction velocity can become higher than the diffusion velocity under a high reaction temperature condition even in the meso-pores. Accordingly, even if the coating layer has meso-pores, it may serve as a diffusion resistance.

FIG. 1(D) shows a case where the coating layer has pores having diameters of, e.g., about 50 nm or more (hereafter referred to as "macro-pores"). The CO concentration gradient formation mechanism is basically similar to that for meso-pores. For the macro-pores, however, as shown in FIG. 1(D), carrier particles are supported therein, and the coating-layer metal is supported on the carrier particles.

While pores having simple shapes are shown in FIG. 1 for the convenience of description, the configuration of the pores is not particularly limited, as long as each pore forms a CO concentration gradient. For example, the pores may be the micro-pores of the crystal lattice of a material typified by zeolite, the micro-pores of a material such as activated carbon, the linear pores of a material typified by mesoporous silica MCM-41, SBA-15, the three-dimensional pores of a material typified by KIT-6, random pores, regular gaps which occur when filling a sphere most densely, or random gaps among or in particles. For the orientation, the pores are preferably oriented perpendicular to the supported metal catalyst surface, as in mesoporous silica. Such orientation is advantageous in that the size and length of the pores can be uniformly controlled.

Conceivable examples of the material of the coating layer include silica, titania, zirconia, alumina, composite oxides thereof, and carbon. However, any type of oxide can be used in principle, as long as pores can be formed therein. Note that in order to allow the coating-layer metal to be supported in the pores, it is preferred to form a coating layer from a material which is not strongly basic. This is because use of a basic oxide facilitates adsorption of $CO_2$, which is an acidic molecule, and thus causes reverse water-gas shift acting as a side reaction and $CO_2$ methanation.

If the coating layer is made of mesoporous silica, the mesoporous silica preferably contains 0.1 to 50% by mass of Ti (on a $TiO_2$ basis). This is because it was experimentally confirmed that if the mesoporous silica contained Ti, the catalyst life was increased. Although the mechanism in which the catalyst life is increased is yet to be clarified, the inventors assume that Ti stabilizes the porous structure of the mesoporous silica.

The mesoporous silica also preferably contains at least one added metal selected from Ti, La, and Zr. Containing such an added metal improves steam resistance. The atomic ratio of the added metal to Si is, for example, 0.001 to 3, preferably 0.01 to 3. These atomic ratios particularly improve steam resistance. More specifically, the atomic ratio is, for example, 0.001, 0.01, 0.1, 0.2, 0.3, 0.4, 0.5, 0.6, 0.7, 0.8, 0.9, 1, 1.1, 1.2, 1.3, 1.4, 1.5, 2, 2.5, or 3, or may be between any two of the values presented. For Ti, the inventors confirmed that increasing the atomic ratio of Ti to Si improved steam resistance. Accordingly, Ti/Si is preferably 0.5 to 3.

As described above, the thickness of the coating layer and the diameter of the pores are selected as appropriate according to the desired CO concentration on the supported metal catalyst surface. More specifically, the thickness of the coating layer is, for example, 5, 10, 15, 20, 25, 30, 35, 40, 45, 50, 60, 70, 80, 90, 100, 150, or 200 nm, or may be between any two of the values presented. The diameter of the pores is, for example, 0.5 to 100 nm. More specifically, it is, for example, 0.5, 1, 1.5, 2, 2.5, 3, 3.5, 4, 4.5, 5, 5.5, 6, 6.5, 7, 7.5, 8, 8.5, 9, 9.5, 10, 20, 30, 40, 50, 60, 70, 80, 90, or 100 nm, or may be between any two of the values presented.

The active metal of the supported metal catalyst and a carrier for the supported metal catalyst are not limited to those of particular types and only have to have a CO methanation function as described in Patent Literature 1 and 2. Specifically, the active metal may be, for example, Ni, Ru, Fe, Co, V, Nb, Ta, Cr, Mo, W, Mn, Tc, Re, or composites thereof. The carrier may be, for example, an oxide, nitride, or carbide containing at least one of Al, V, Ti, Zr, Si, Mg, and Ce, and specific examples thereof include zeolite and silica alumina. Further, the supported metal catalyst preferably contains a methanation reaction inhibitor for selectively suppressing a $CO_2$ methanation reaction. The methanation reaction inhibitor may be a material which turns the surface charge of the active metal into the δ+ side or various kinds of materials having an effect of suppressing the $CO_2$ methanation activity. Preferably, the methanation reaction inhibitor contains one or more of halogen elements such as F, Cl, Br, and I, inorganic acids such as HCl, $HNO_3$, $H_2SO_4$, and $H_3PO_4$, and metal oxygen acids such as boric acid, vanadic acid, tungstic acid, and chromic acid. The existence forms on the catalyst depend on the respective formation processes and therefore are not limited to the above respective compounds. The active metal and carrier may be precursors, reactants, or decomposition products thereof. Specifically, the active metal is, for example, Ni or an alloy or mixture of Ni and V, and the carrier is, for example, an Al oxide containing a V oxide (that is, a state in which a V oxide is supported, or dispersed and mixed in the matrix of an Al oxide). An experiment described in Patent Literature 1 and the like reveal that supported metal catalysts configured as described above can selectively methanize CO over a long period of time.

The carrier may also be mesoporous silica. In particular, if a catalyst containing Ni and Fe is supported on a carrier made of mesoporous silica, there can be obtained an advantage that degradation of the catalytic activity is significantly delayed without having to provide a coating layer. The atomic ratio Fe/Ni is, for example, 0.01 to 1, preferably 0.05 to 0.5. More specifically, the atomic ratio is, for example, 0.01, 0.02, 0.03, 0.04, 0.05, 0.06, 0.07, 0.08, 0.09, 0.1, 0.15, 0.2, 0.3, 0.4, 0.5, 0.6, 0.7, 0.8, 0.9, or 1, or may be between any two of the values presented. The specific composition of the mesoporous silica is as described above.

The following configuration may also be employed: the above active metal is supported as a supported metal catalyst on a carrier made of mesoporous silica; mesoporous silica is formed as a coating layer on the supported metal catalyst; and a coating layer-metal is supported on the coating layer.

3. Method for Preparing Selective CO Methanation Catalyst

The inventors evaluated the life and activity of the supported metal catalyst having the coating layer formed thereon and found a phenomenon in which the formed coating layer drastically increased the activity. The inventors then noted, as the activity increase mechanism, the step of mixing the supported metal catalyst with water during formation of the coating layer (mesoporous silica). They then made a hypothesis that the water treatment caused one or more of the following factors and thus increased the activity: (1) a change in the composition of the metal surface; (2) reforming of the metal surface (a change in roughness or the like); (3) a change in the exposed crystal surface of the metal surface; and (4) a change in the mixture state of the additive (vanadium, etc.) and Ni. Then, to verify the validity of this hypothesis, the inventors performed a step of simply mixing a supported metal catalyst with water and a step of calcination for the mixture, without adding, to a mixed solution, a raw material required to make mesoporous silica. They then evaluated the activity of a catalyst obtained in these steps. They then found that the catalyst had an initial activity approximately similar to that of the coated catalyst and that this activity increase was not caused by the coating layer but principally caused by the water treatment.

A method for preparing a selective CO methanation catalyst according to one embodiment of the present invention includes a step of mixing, with water, a supported metal catalyst which selectively methanizes CO in a hydrogen-rich gas containing CO and $CO_2$ and a step of calcination for the solid content of the supported metal catalyst mixed with the water at 300 to 800° C.

The water mixed in the mixing step may be pure water or may be water in an aqueous solution (e.g., ammonia water) or in a suspension. In mixing ammonia water, ammonia water having a relatively high concentration may be mixed with the supported metal catalyst along with water, or a previously diluted low-concentration ammonia water may be mixed with the supported metal catalyst. While water is preferably mixed to the extent that a suspension of the supported metal catalyst is formed, it may be mixed to the extent that the supported metal catalyst powder is moistened with water. The ammonia concentration of the mixed solution obtained in the mixing step is not particularly limited, but is, for example, 0.05 to 10 mass %, preferably 0.1 to 1 mass %. More specifically, the ammonia concentration is, for example, 0.05, 0.1, 0.2, 0.3, 0.4, 0.5, 0.6, 0.7, 0.8, 0.9, 1, 2, 3, 4, 5, 6, 7, 8, 9, or 10 mass %, or may be between any two of the values presented. Too low a concentration of ammonia water makes an ammine complex less likely to be formed; too high a concentration thereof causes excessive dissolution and elution of the Ni content, reducing the amount of supported Ni.

The calcination temperature is, for example, 300 to 800° C., preferably 450 to 650° C. More specifically, it is, for example, 300, 350, 400, 450, 500, 550, 600, 650, 700, 750, or 800° C., or may be between any two of the values presented.

The method for extracting the solid content of the mixed solution obtained in the mixing step is not particularly limited, but may be a solid-liquid separation method, such as filtration or centrifugation. The solid content extracted using the solid-liquid separation method may be dried. The mixed solution may be dried and fired as it is without being filtered or separated.

By using the above method, the degree of dispersion of the active metal of the supported metal catalyst is improved, and there can be obtained a selective CO methanation catalyst where the active metal is dispersed uniformly on the surface of the supported metal catalyst.

To form a coating layer along with water treatment (e.g., ammonia water treatment), the raw material of the coating layer is mixed with the mixed solution obtained in the mixing step. If the coating layer is made of mesoporous silica, the raw material of the coating layer can be mixed by first mixing alkyltrimethylammonium salt (e.g., hexadecyltrimethylammonium bromide) into the mixed solution and then mixing an alkoxide solution of tetraethyl orthosilicate into the resulting mixed solution. Titanium isopropoxide may be added to the alkoxide solution so that the mesoporous silica contains Ti. To form other types of coating layers, it is only necessary to supply raw materials required to form the respective types of coating layers. A coating layer may be formed without performing water treatment or may be formed after the calcination step.

EXAMPLES

Various experiments below were conducted to demonstrate the effects of the present invention.

1. Preparation Example 1

Preparation of Al-VOx Catalyst Powder by Coprecipitation and Impregnation with Ni An Al-VOx catalyst powder serving as a catalyst carrier was prepared using the following method. To 61 mL of pure water was added 0.60 g of ammonium vanadate $(NH_4)_2VO_3$ and then the solution was heated and dissolved. Also, 44.1 g of aluminum nitrate was dissolved in 235 mL of pure water. After mixing the two solutions, the resulting mixed solution is poured into a 2 L-beaker, and an aqueous solution of ammonium carbonate was added dropwise with stirring at 2500 rpm for about 15 minutes to obtain pH 8. Subsequently, stirring was continued for 30 min. The resulting precipitation was filtered with a 0.2-μm membrane filter and washed with 1 L-pure water. The resulting precipitation was vacuum-dried at room temperature for half a day and then dried in a drying oven at 110° C. for 12 h. The resulting gel was ground and then fired in the air at 500° C. for 3 h to give an oxide carrier with a molar ratio of Al:V=0.96:0.04.

Next, 6.26 g of the Al-VOx catalyst powder was added to 50 mL of pure water to give a suspension. Also, 12.8 g of nickel nitrate $Ni(NO_3)_2.6H_2O$ (manufactured by Kanto Chemical Co., Inc.) was dissolved in 50 mL of pure water. Then, while stirring the oxide carrier suspension, the whole quantity of an aqueous solution of nickel nitrate was added using a burette for about 20 min. The resulting mixed solution was stirred at room temperature for 30 min, then stirred in a water bath at 45° C. for 30 min, and temporarily cooled to room temperature. The resulting mixed solution was then placed in a water bath at to 50° C. in an evaporator to evaporate all moisture. The resulting powder was dried at 110° C. for 12 h and then fired at 500° C. for 3 h to give a 30 wt % Ni/Al-VOx catalyst powder supporting 30 wt % of Ni on a metal basis.

2. Preparation Example 2

Construction of Ti-MCM Layer on 30 wt %/Ni/Al-VOx Catalyst Powder

A Ti-MCM layer was constructed on the 30 wt % Ni/Al-VOx catalyst powder prepared in Preparation Example 1 using the following method.

To 150 mL of extra-pure water were added 5.00 g of the 30 wt % Ni/Al-VOx powder and 2.00 g of 28% ammonia water (manufactured by Kanto Chemical Co., Inc.) to obtain a suspension. Also, 0.6 g of hexadecyltrimethylammonium bromide (manufactured by Acros Organics) was added to a mixed solution of 40 mL of ethanol (manufactured by Kanto Chemical Co., Inc.) and 6 mL of extra-pure water and dissolved. Also, 1.20 g of tetraethyl orthosilicate (manufactured by Kanto Chemical Co., Inc.), 0.05 g of titanium isopropoxide (manufactured by Kanto Chemical Co., Inc.) and 0.25 g of acetylacetone (manufactured by Kanto Chemical Co., Inc.) were added to 8 mL of ethanol to obtain an alkoxide solution. While stirring the 30 wt % Ni/Al-VOx suspension, the whole quantity of the hexadecyltrimethylammonium bromide solution was added using a pipette for 1 min, and the resulting suspension was stirred at room temperature for 30 min. Then, while stirring the suspension, the whole quantity of the alkoxide solution was added using a pipette for 1 min and stirred at room temperature for 16 h. Then, the resulting suspension was filtered, and the residue was washed with 400 mL of ethanol. The resulting residue was vacuum-dried at room temperature, further dried at 250° C. for 1.5 h, and then fired at 550° C. for 4 h to give a Ti-MCM/30 wt % Ni/Al-VOx catalyst powder having a 15 nm-thick diffusion resistance layer constructed thereon.

3. Preparation Example 3

Construction of MCM Layer on 30 wt % Ni/Al-VOx Catalyst Powder

A MCM layer not containing Ti was constructed on the 30 wt % Ni/Al-VOx catalyst powder prepared in Preparation Example 1 using the following method.

To 150 mL of extra-pure water were added 5.00 g of the 30 wt % Ni/Al-VOx powder and 2.00 g of 28% ammonia water (manufactured by Kanto Chemical Co., Inc.) to obtain a suspension. Also, 0.6 g of hexadecyltrimethylammonium bromide (manufactured by Acros Organics) was added to a mixed solution of 40 mL of ethanol (manufactured by Kanto Chemical Co., Inc.) and 6 mL of extra-pure water and dissolved. Also, 1.20 g of tetraethyl orthosilicate (manufactured by Kanto Chemical Co., Inc.) was added to 8 mL of ethanol to obtain an alkoxide solution. While stirring the 30 wt % Ni/Al-VOx suspension, the whole quantity of the hexadecyltrimethylammonium bromide solution was added using a pipette for 1 min, and the resulting suspension was stirred at room temperature for 30 min. Then, while stirring the suspension, the whole quantity of the alkoxide solution was added using a pipette for 1 min and then stirred at room temperature for 16 h. Then, the suspension was filtered, and the residue was washed with 400 mL of ethanol. The resulting residue was vacuum-dried at room temperature, further dried at 250° C. for 1.5 h, and then fired at 550° C. for 4 h to give a MCM/30 wt % Ni/Al-VOx catalyst powder having a nm-thick diffusion resistance layer constructed thereon.

4. Preparation Example 4

Construction of Silica Layer on 30 wt % Ni/Al-VOx Catalyst Powder

A silica layer having no meso-pores was constructed on the 30 wt % Ni/Al-VOx catalyst powder prepared in Preparation Example 1 using the following method.

To 150 mL of extra-pure water were added 5.00 g of the 30 wt % Ni/Al-VOx powder and 2.00 g of 28% ammonia water (manufactured by Kanto Chemical Co., Inc.) to obtain a suspension. Also, 1.20 g of tetraethyl orthosilicate (manufactured by Kanto Chemical Co., Inc.) was added to 8 mL of ethanol to obtain an alkoxide solution. While stirring the 30 wt % Ni/Al-VOx suspension, the whole quantity of the alkoxide solution was added using a pipette for 1 min and stirred at room temperature for 16 h. Then, the suspension was filtered, and the residue was washed with 400 mL of ethanol. The resulting residue was vacuum-dried at room temperature, further dried at 250° C. for 1.5 h, and then fired at 550° C. for 4 h to give a SiO$_2$/30 wt % Ni/Al-VOx catalyst powder.

5. Preparation Example 5

Ammonia Water Treatment of 30 wt % Ni/Al-VOx Catalyst Powder

The 30 wt % Ni/Al-VOx catalyst powder prepared in Preparation Example 1 was treated with ammonia water using the following method.

To 150 mL of extra-pure water were added 5.00 g of the 30 wt % Ni/Al-VOx powder and 2.00 g of 28% ammonia water (manufactured by Kanto Chemical Co., Inc.) to obtain a suspension, which was then stirred at room temperature for 16 h. Then, the suspension was filtered, and the residue was washed with 400 mL of ethanol. The resulting residue was vacuum-dried at room temperature, further dried at 250° C. for 1.5 h, and then fired at 550° C. for 4 h to give an ammonia water-treated 30 wt % Ni/Al-VOx catalyst powder.

6. Preparation Example 6

Water Treatment of 30 wt % Ni/Al-VOx Catalyst Powder

The 30 wt % Ni/Al-VOx catalyst powder prepared in Preparation Example 1 was treated with water using the following method.

To 150 mL of extra-pure water was added 5.00 g of the 30 wt % Ni/Al-VOx powder to obtain a suspension, which was then stirred at room temperature for 16 h. Then, the suspension was filtered, and the residue was washed with 400 mL of ethanol. The resulting residue was vacuum-dried at room temperature, further dried at 250° C. for 1.5 h, and then fired at 550° C. for 4 h to give a water-treated 30 wt % Ni/Al-VOx catalyst powder.

7. Evaluation of Initial Properties of Catalysts

The conditions for evaluating the activity of the catalysts and the procedure are described below. Prior to evaluating the activity, the catalyst samples were hydrogen-reduced. This process aimed to reduce the active component of the catalysts. The reduction was performed by passing an H$_2$ gas through a reaction tube at 500 mL/min, raising the temperature to 500° C. at 20° C./min, and maintaining the temperature for 1 h. After the reduction, the H$_2$ gas was changed to an N$_2$ gas, which was then passed for 5 min to purge H$_2$. Then, the temperature was lowered to a temperature for evaluating the activity of the catalyst. Then, introduction of steam into the reaction tube was begun, and a reaction gas was introduced 5 min later. The steam supply velocity was a value equivalent to steam/CO=34 (molar ratio). Then, deionized water was sent to a vaporizer maintained at 200° C. using a micropump, and the generated steam was introduced into the reaction tube using an N$_2$ carrier gas. Each reaction gas was introduced into the reaction tube using a mass flow controller. The composition on a dry basis was as follows: CO 0.5 vol %, H$_2$ 80 vol %, and CO$_2$ 19 vol %. The superficial velocity SV was set to 4800 h$^{-1}$. A 13 mm-outer-diameter quartz tube was used as the reaction tube. Two point one mL of particulate catalyst sized to 1.1 to 2 mm was placed in a predetermined central position of the reaction tube. The tip of a sheathed thermocouple was inserted to a position about 2 mm away from the upper edge of the catalyst layer to measure the temperature of the catalyst layer. The gas from the reaction tube outlet was quantified using a nondispersive infrared analyzer (manufactured by HORIBA, Ltd.).

Figure 4:
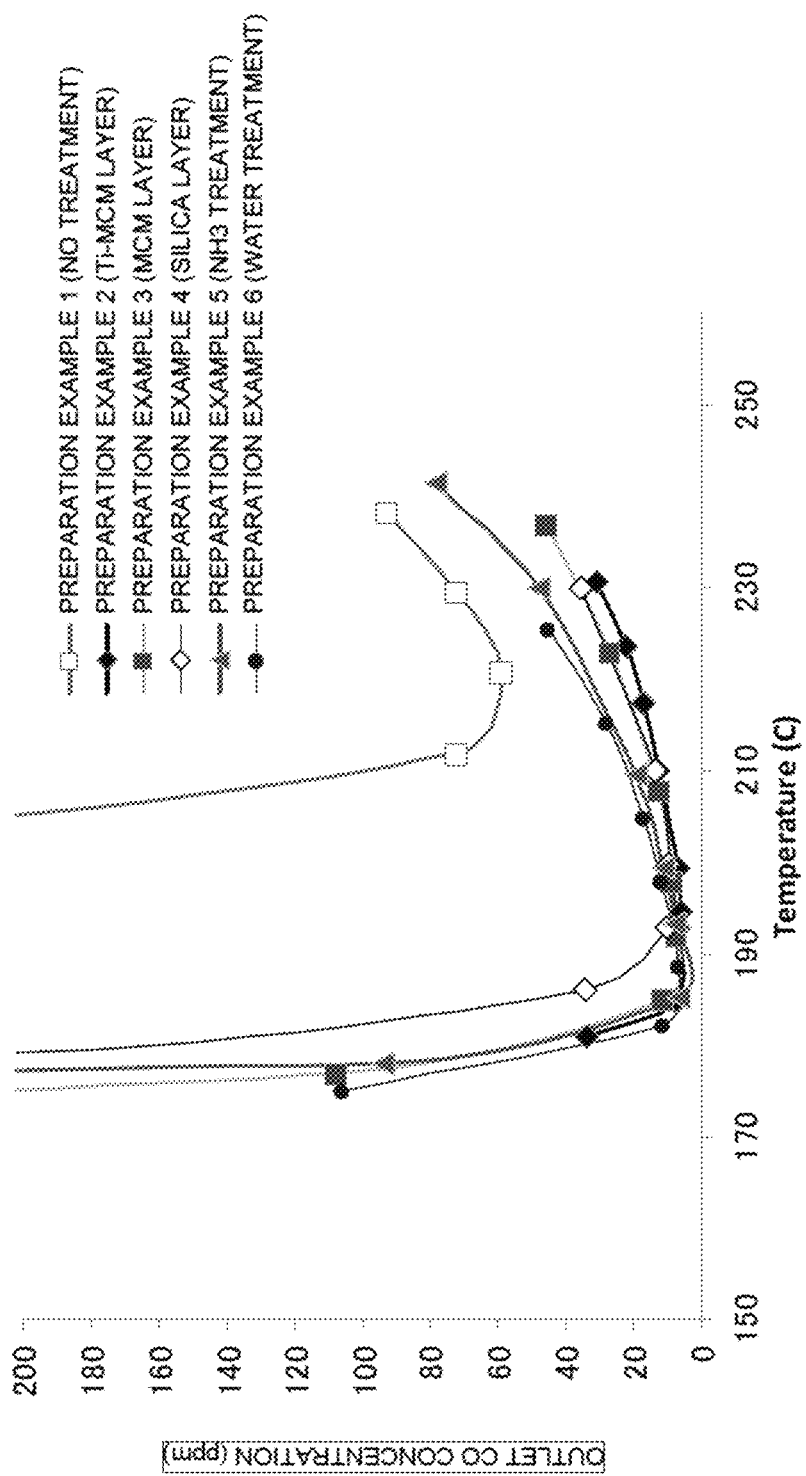
FIG. 4 is a graph showing the evaluation results of initial properties of catalysts of Preparation Examples 1 to 5.

The results obtained using the above method are shown in FIG. 4. Referring to FIG. 4, for the catalyst of Preparation Example 1, which was treated with none of ammonia water and water, the temperature at which the outlet CO concentration was minimized was high, the lowest value of the outlet CO concentration value was high, and the temperature range in which the lowest value could be achieved was very narrow. On the other hand, for the catalysts of Preparation Examples 2 to 6, which were treated with ammonia water or water, the temperature at which the outlet CO concentration was minimized was low, the lowest value of the outlet CO concentration value was very low, and the temperature range in which the lowest value could be achieved was wider than that of Preparation Example 1.

As seen above, the excellent results were obtained from all the catalysts which were treated with ammonia water or water, regardless of the presence or absence of the coating layer formed on the supported metal catalyst. Accordingly, it can be said that containing ammonia in water was not essential but rather the results were obtained owing to the water treatment. Although the reason for these activity increases is yet to be completely clarified, the inventors assume that the activity increases were caused by one or more of the following factors: (1) a change in the composition of the metal surface; (2) reforming of the metal surface (a change in roughness or the like); (3) a change in the exposed crystal surface of the metal surface; and (4) a change in the mixture state of the additive (vanadium, etc.) and Ni.

The atomic composition of the catalyst surface shown in Table 1, which was obtained from XPS measurements, indicates that (1) and (4) of the above factors can be particularly important. Table 1 shows that by performing water treatment, the atomic ratio V/Ni around the surface increased from 0.20 to 0.22 by about 10%. Table 1 also shows that the ratio Ni/Al decreased from 0.61 to 0.54 by 10%, meaning that V moved to the Ni surface due to the water treatment. That is, it is indicated that there occurred a change in the interaction between V and Ni due to the water treatment and that such a change caused the activity increases.

TABLE 1

Changes in Surface Composition Depending on With or Without Water Treatment on Ni/AlVOx

| Element/element percentage | Without water treatment | With water treatment |
| --- | --- | --- |
| Ni (atom %) | 13.29 | 13.9 |
| V (atom %) | 2.67 | 3.12 |
| Al (atom %) | 21.95 | 25.61 |
| O (atom %) | 62.09 | 57.37 |
| V/Ni (—) | 0.20 | 0.22 |
| V/Al (—) | 0.12 | 0.12 |
| Ni/Al (—) | 0.61 | 0.54 |

8. Long-Term Tests on Catalysts

Figure 5A:
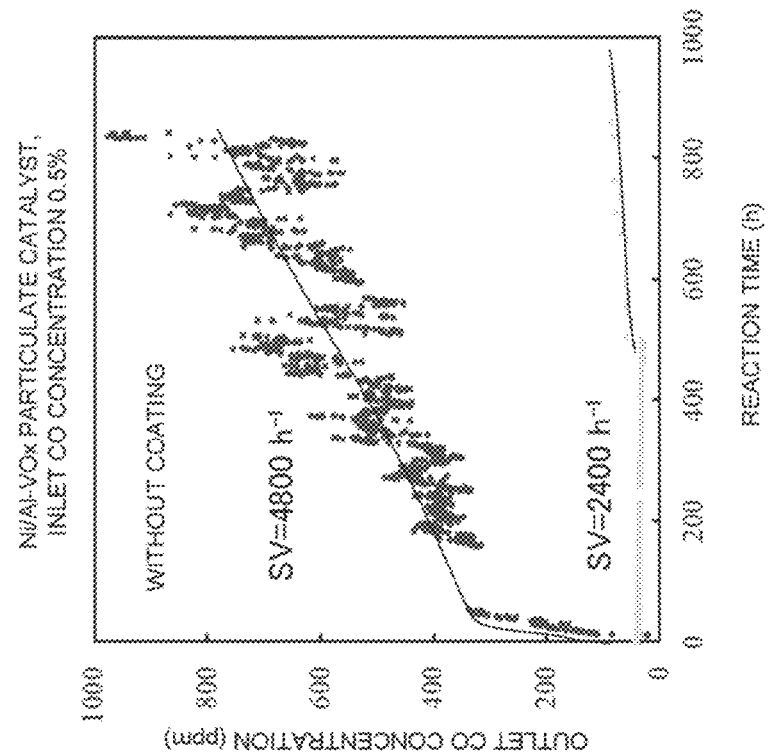
FIGS. 5(A) and 5(B) are graphs showing the results of long-term tests on the catalysts of Preparation Examples 2 and 1.
Figure 5B:
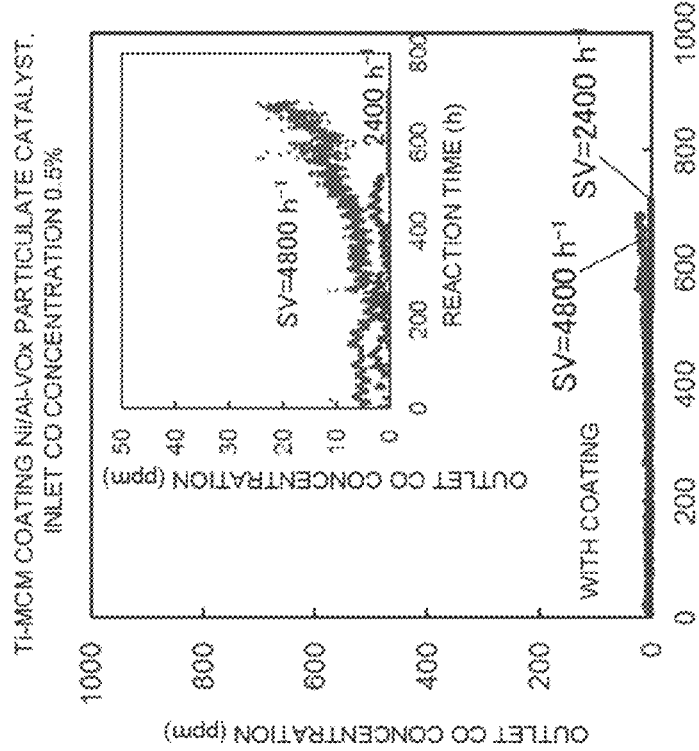
Figure 6:
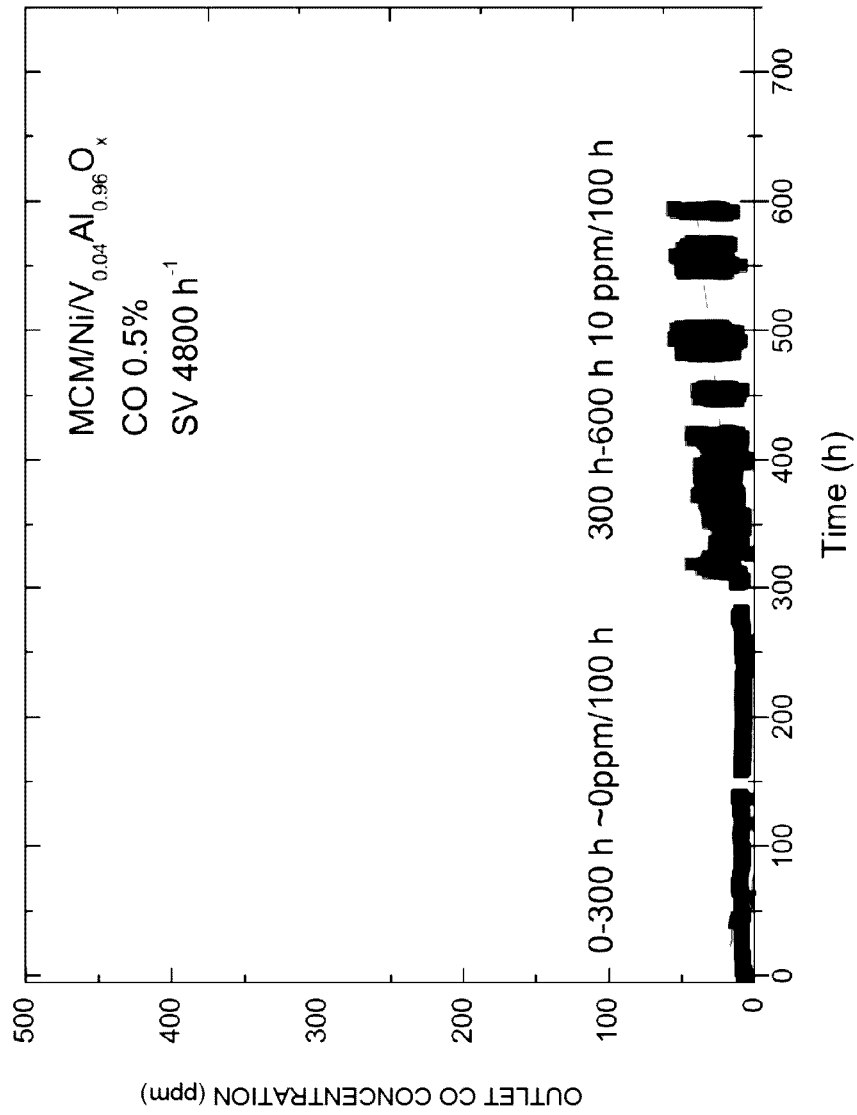
FIG. 6 is a graph showing the result of the long-term test on the catalyst of Preparation Example 3.

Next, long-term tests were conducted on the catalysts under conditions similar to those of "7. Evaluation of Initial Properties of Catalysts." In the long-term tests, the temperature condition was set to 190° C. The results are shown in FIGS. 5 to 7. FIG. 5(A) shows the results about the catalyst prepared in Preparation Example 2, in which the supported metal catalyst was coated with the Ti-MCM layer, and FIG. 5(B) shows the results about the catalyst prepared in Preparation Example 1, in which no coating layer was formed on the supported metal catalyst. As is apparent from a comparison between these figures, for the catalyst coated with the Ti-MCM layer, the outlet CO concentration was maintained at very low values until 400 h and thereafter gradually increased. On the other hand, for the uncoated catalyst, the outlet CO concentration began increasing immediately after the reaction began. As seen above, a significant difference was observed between the lives of the coated and uncoated catalysts.

FIG. 6 shows the results about the catalyst prepared in Preparation Example 3, in which the supported metal catalyst was coated with the MCM layer not containing Ti. The results reveal that the outlet CO concentration was maintained at very low values until 300 h and thereafter gradually increased. The increase rate of the outlet CO concentration was higher than that of the catalyst coated with the Ti-MCM layer of Preparation Example 2. Through a comparison between FIGS. 5(A) and 6, it was confirmed that containing Ti in the MCM layer increased the life of the catalyst.

FIG. 7 shows the results about the catalyst prepared in Preparation Example 5, in which the supported metal catalyst was treated with ammonia water. The results reveal that the outlet CO concentration gradually increased immediately after the reaction began. However, the increase rate was lower than that of the catalyst of Preparation Example 1, which was not treated with ammonia water. The inventors assume that the reason is that the increase in the catalytic activity due to the ammonia water treatment reduced the CO concentration in the catalyst, as shown in FIG. 4. Accordingly, they assume that the CO poisoning resistance of the catalyst was not substantially increased by the ammonia water treatment.

9. Analysis of Element Distribution

Figures 8A, 8B:
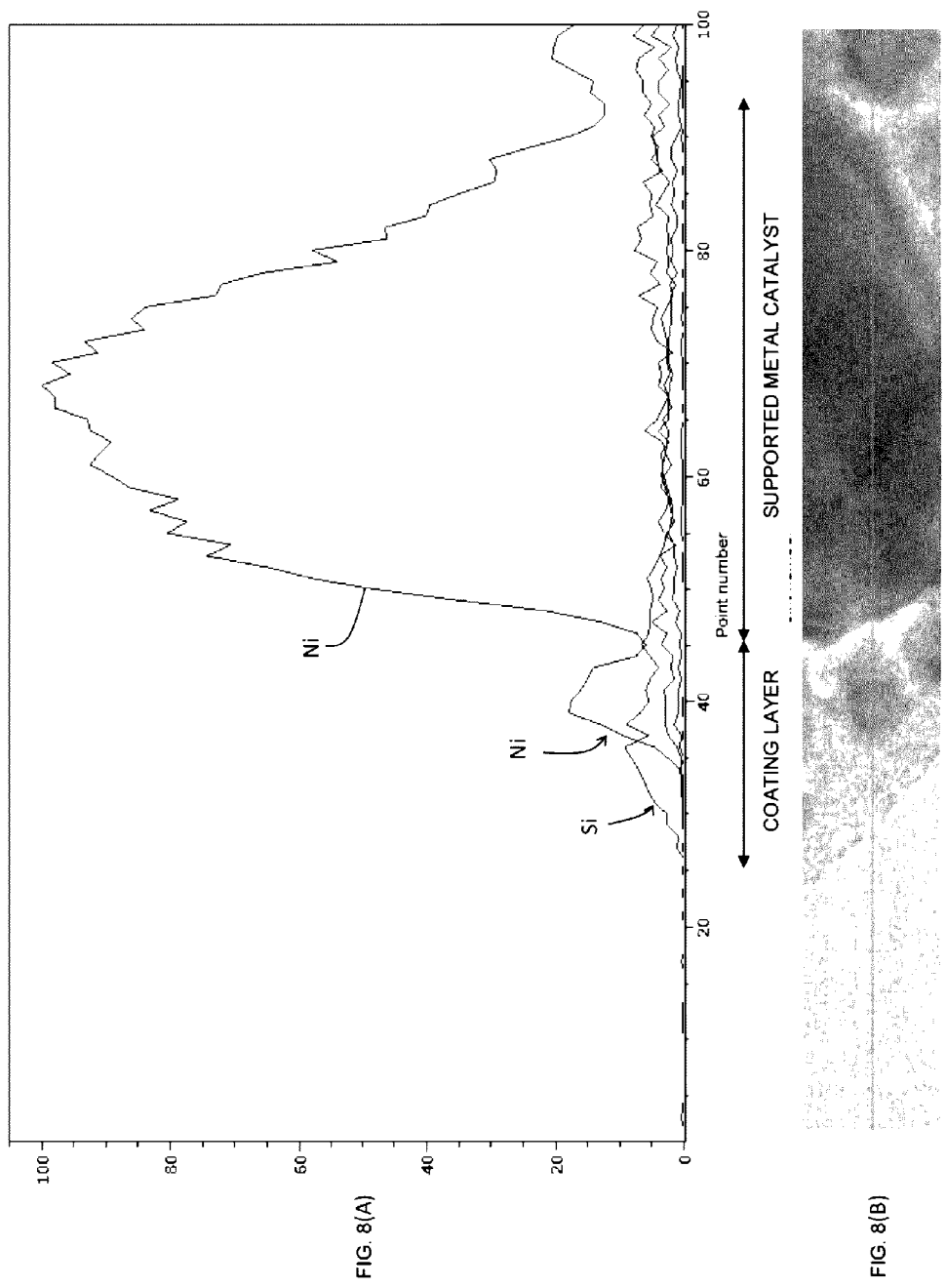
FIG. 8(A) is a graph showing the analysis result of the element distribution of the catalyst of Preparation Example 2.
FIG. 8(B) is a TEM photograph of the analyzed position.

Elemental analysis was conducted on the catalyst prepared in Preparation Example 2 using scanning transmission electron microscopy-energy-dispersive X-ray spectroscopy (STEM-EDS). The results are shown in FIG. 8. FIG. 8(A) is a graph showing the element distribution of Ni and Si, and FIG. 8(B) is a TEM photograph of the position where the element distribution of FIG. 8(A) was analyzed. The range of the supported metal catalyst and the range of the coating layer were identified based on this TEM photograph. The graph of FIG. 8(A) reveals that Ni distributed also in the coating layer. Thus, the inventors assume that this Ni was involved in the formation of a CO concentration gradient layer.

10. Dependence on CO Concentration

Next, a long-term test was conducted on the catalyst prepared in Preparation Example 1 using the method described in "7. Evaluation of Initial Properties of Catalysts" while changing the CO concentration, and the dependence of the degradation of the catalyst on the CO concentration was investigated. The results are shown in FIG. 9. FIG. 9 reveals that the catalyst degraded faster as the CO concentration becomes higher and that the catalyst degraded extremely slowly when the CO concentration was 0.2% or less.

11. Effects of Support of Metal on Coating Layer

A catalyst in which a Ni—Cu alloy and Ni—MgO were supported on the Ti-MCM/30 wt % Ni/Al-VOx catalyst powder prepared in Preparation Example 2 was prepared using the following method.

To 50.0 mL of pure water was added 5.00 g of the Ti-MCM/30 wt % Ni/Al-VOx catalyst powder to obtain a suspension. Also, 1.24 g of nickel nitrate Ni(N$_3$O)$_2$.6H$_2$O (manufactured by Kanto Chemical Co., Inc.) and 0.19 g of copper nitrate trihydrate (manufactured by Kanto Chemical Co., Inc.) were dissolved in 50 mL of pure water. While stirring the catalyst suspension, the whole quantity of the mixed aqueous solution of nickel nitrate and copper nitrate was added using a burette for about 20 min. The resulting mixed aqueous solution was stirred at room temperature for 30 min, then stirred in a water bath at 45° C. for 30 min, and then temporarily cooled to room temperature. The mixed aqueous solution was then placed in an evaporator in a water bath at 35 to 50° C. to evaporate all moisture. The resulting powder was dried at 110° C. for 12 h and then fired at 500° C. for 3 h to give a Ni—Cu/Ti-MCM/30 wt % Ni/Al-VOx catalyst powder in which 5 wt % of Ni and 1 wt % of copper on a metal basis were supported on a coating layer.

Next, 5.00 g of the Ti-MCM/30 wt % Ni/Al-VOx catalyst powder was added to 50.0 mL of pure water to obtain a suspension. Also, 1.24 g of nickel nitrate Ni(NO$_3$)$_2$.6H$_2$O (manufactured by Kanto Chemical Co., Inc.) and 0.53 g of magnesium nitrate hexahydrate (manufactured by Kanto Chemical Co., Inc.) were dissolved in 50 mL of pure water. While stirring the catalyst suspension, the whole quantity of the mixed aqueous solution of nickel nitrate and magnesium nitrate was added using a burette for about 20 min. The resulting mixed aqueous solution was stirred at room temperature for 30 min, then stirred in a water bath at 45° C. for 30 min, and then temporarily cooled to room temperature. The resulting mixed aqueous solution was then placed in an evaporator in a water bath at 35 to 50° C. to evaporate all moisture. The resulting powder was dried at 110° C. for 12 h and then fired at 500° C. for 3 h to give a Ni—Mg/Ti-MCM/30 wt % Ni/Al-VOx catalyst powder in which 5 wt % of Ni and 1 wt % of magnesium on a metal basis were supported on a coating layer.

Next, long-term tests were conducted on the prepared catalysts under conditions similar to those of "8. Long-Term Tests on Catalysts." Note that the superficial velocity was set to 10000 h$^{-1}$. The results are shown in FIG. 10. FIG. 10 reveals that for the catalysts to which Cu or MgO was added, the outlet CO concentration increased more slowly than that of a catalyst to which no such substance was added. This means that the addition of the coating-layer metals reduced the CO concentration on the supported metal catalyst surface.

12. Preparation and Evaluation of Catalyst Using Ti-MCM as Carrier

To investigate the durability of a coating layer, a catalyst using Ti-MCM as a carrier was prepared using the following method.

First, a Ti-MCM powder (atomic ratio Ti/Si: 0.03) was prepared using the sol-gel method.

Specifically, 2.9 g of hexadecyltrimethylammonium bromide (manufactured by Acros Organics) was added to a mixed solution of 298 mL of ethanol (manufactured by Kanto Chemical Co., Inc.) and 24 mL of extra-pure water and dissolved. Then, 8.1 g of 28% ammonia water (manufactured by Kanto Chemical Co., Inc.) and 537 mL of extra-pure water were mixed and added to the above solution. Then, an alkoxide solution was prepared from 5.92 g of tetraethyl orthosilicatetetraethyl orthosilicate (manufactured by Kanto Chemical Co., Inc.), 0.18 g of titanium isopropoxide (manufactured by Kanto Chemical Co., Inc.), and 1.26 g of acetylacetone (manufactured by Kanto Chemical Co., Inc.). Then, while stirring the hexadecyltrimethylammonium bromide solution, the whole quantity of the alkoxide solution was added using a pipette for 3 min and stirred at room temperature for 16 h. Then, the suspension was filtered, and the residue was washed with 400 mL of ethanol. The resulting residue was vacuum-dried at room temperature, further dried at 250° C. for 1.5 h, and then fired at 550° C. for 4 h to give a Ti-MCM powder. Then, this powder was caused to support Ni, Ni—Cu, Ni—Mg, and Ni—Fe thereon to give a Ti-MCM catalyst. This support was performed in such a manner that the amount of supported Ni became 10 wt %. The atomic ratio of Cu, Mg, and Fe to Ni was set to 0.1. Support of these metals was performed using incipient wetness impregnation. Specifically, one of the following mixed solutions was added dropwise to 5 g of the Ti-MCM powder using a pipette and fired at 110° C. for 5 h and at 500° C. for 3 h: a 4-mL mixed aqueous solution of Ni acetate hydrate (manufactured by Kanto Chemical Co., Inc.) and copper acetate hydrate (manufactured by Kanto Chemical Co., Inc.); a 4-mL mixed aqueous solution of Ni acetate hydrate (manufactured by Kanto Chemical Co., Inc.) and magnesium acetate hydrate (manufactured by Kanto Chemical Co., Inc.); and a 4-mL mixed aqueous solution of Ni acetate hydrate (manufactured by Kanto Chemical Co., Inc.) and iron acetate hydrate (manufactured by Kanto Chemical Co., Inc.). In the respective mixed aqueous solutions, the atomic ratio Ni:M (M is Cu, Mg, or Fe) was adjusted to 1:0.1. This process was repeated three times to give a 10 wt % Ni—Cu/Ti-MCM powder, a 10 wt % Ni—Mg/Ti-MCM powder, or a 10 wt % Ni—Fe/Ti-MCM powder.

12. Evaluation of Ti-MCM Catalyst

Next, the Ti-MCM catalyst powder was evaluated under conditions similar to those of "11. Effects of Support of Metal on Coating Layer." The composition of the reaction gas on a dry basis was as follows: CO 0.5 vol %, CO$_2$ 20 vol %, N$_2$ 6 vol %, and H$_2$ 73.5 vol %.

Figure 11:
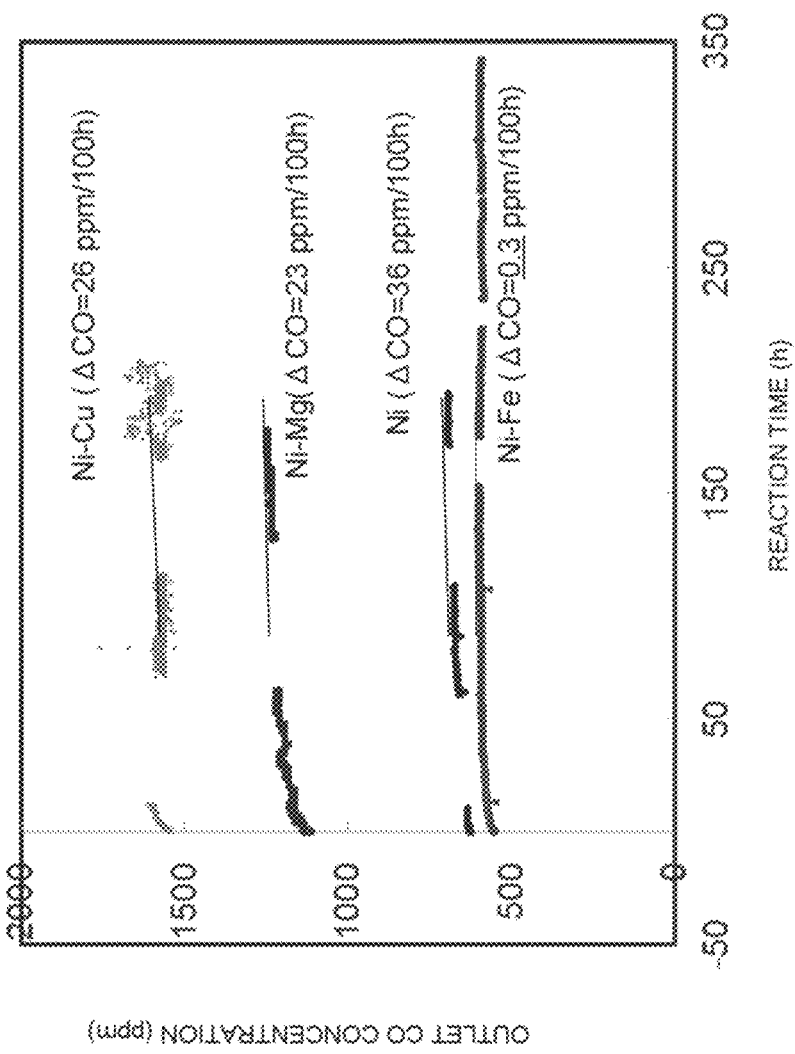
FIG. 11 is a graph showing the result of a long-term test on a Ti-MCM catalyst.

The results obtained using the above method are shown in FIG. 11. FIG. 11 reveals that for the catalysts to which Ni—Cu or Ni—Mg was added, the outlet CO concentration increased more slowly than that of the catalyst to which no such substance was added. FIG. 11 also reveals that for the catalyst to which Ni—Fe was added, the outlet CO concentration increased at a very low velocity, which is 1/100 or less of that of the catalyst to which Ni was added. These results indicate that Ni—Fe is an excellent coating-layer metal. In another point of view, the results of FIG. 11 indicate that the catalyst obtained by causing the Ti-MCM carrier to support Ni—Fe has excellent properties as a selective CO methanation catalyst without having to have a supported metal catalyst.

FIGS. 12(a) to 12(c) show microphotographs of the Ni-added Ti-MCM catalyst powder before the reduction, after the reduction, and after the long-term-test, respectively, and FIG. 12(d) shows XRD patterns thereof. These results indicate that Ni particles having crystallite diameters of 4.3 to 4.4 nm could be uniformly supported in the meso-pores of Ti-MCM.

13. Evaluation of Steam Resistance Properties of Ti-MCM Layer

First, two catalysts which differ from each other in the atomic ratio Ti/Si of the Ti-MCM layer (atomic ratio Ti/Si: 0.1 and 1) were prepared using a method similar to that of Preparation Example 2.

Then, these catalysts were treated with steam using a method similar to that of "11. Effects of Support of Metal on Coating Layer." The steam treatment was performed under the following conditions: the composition of the reaction gas=$H_2O$ 60 vol % and $N_2$ 40 vol %; the reaction temperature=200° C.; and the reaction time=72 h.

With respect to the above two catalysts, the BET specific surface area and pore volume before and after the steam treatment were measured, and microphotographs were taken. The results are shown in FIGS. 13 to 16. In FIGS. 13 to 16, the phase "after calcination" refers to the state immediately before reduction and steam treatment, and the phase "after reduction and steam treatment" refers to the state immediately after the reduction and steam treatment.

Figure 13:
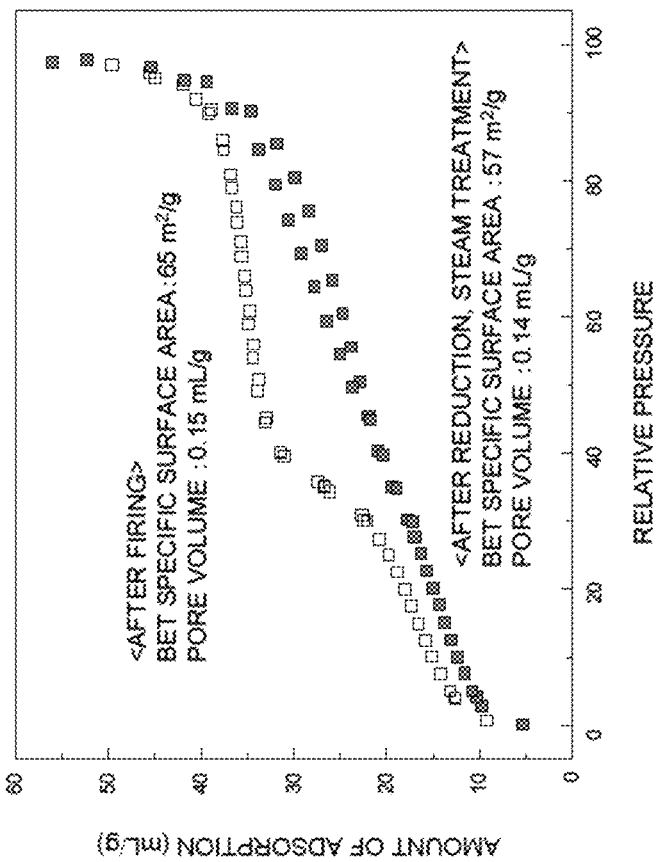
FIG. 13 is a graph showing absorption isotherms about a Ti-MCM layer (atomic ratio Ti/Si=0.1) before and after steam treatment.
Figure 14:
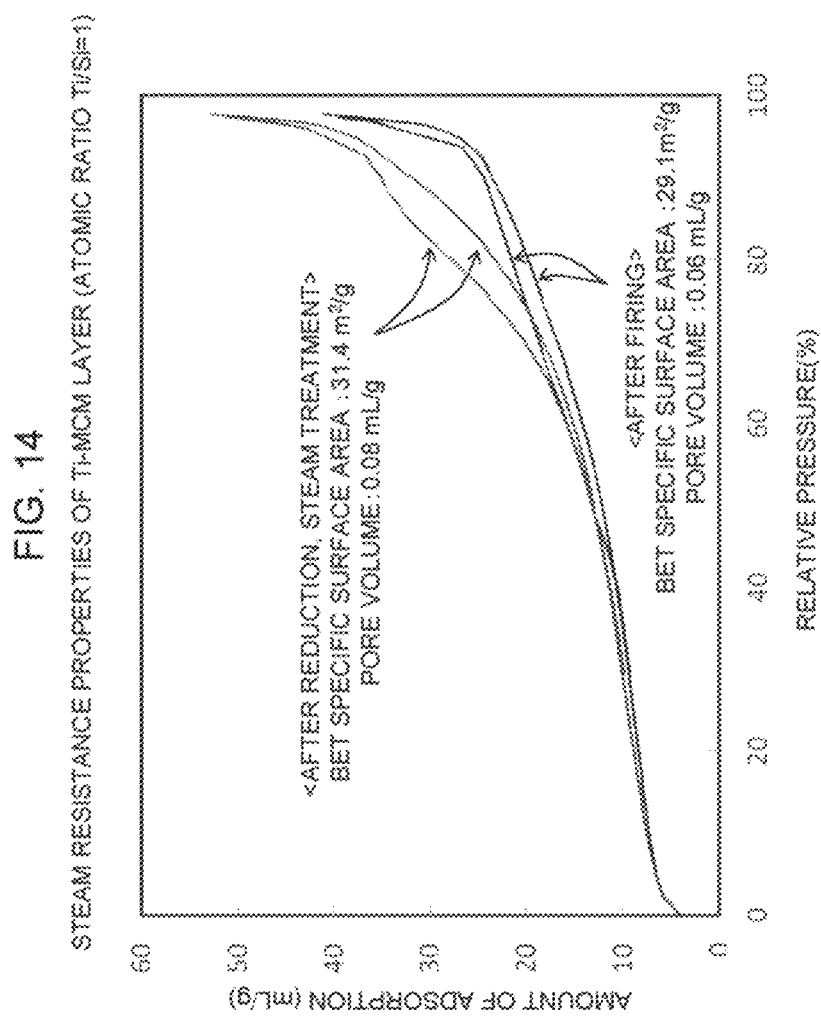
FIG. 14 is a graph showing absorption isotherms about a Ti-MCM layer (atomic ratio Ti/Si=1) before and after steam treatment.

As shown in FIG. 13, for the catalyst whose atomic ratio Ti/Si was 0.1, the specific surface area was significantly decreased due to the steam treatment. On the other hand, as shown in FIG. 14, for the catalyst whose atomic ratio Ti/Si was 1, the specific surface area and pore volume did not decrease due to the steam treatment. These results indicate that the steam resistance properties improved as the atomic ratio Ti/Si increased.

Figure 15:
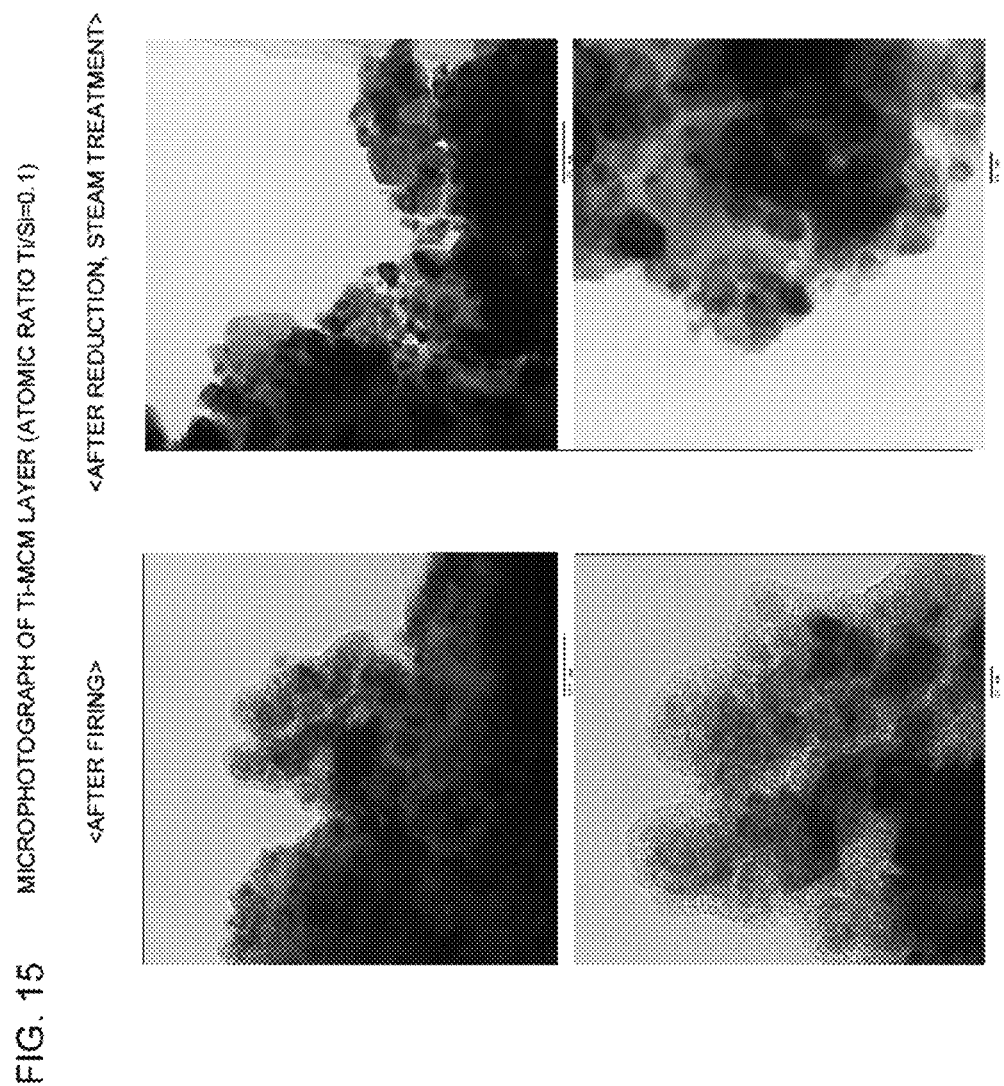
FIG. 15 shows microphotographs about a Ti-MCM layer (atomic ratio Ti/Si=0.1) before and after steam treatment.
Figure 16:
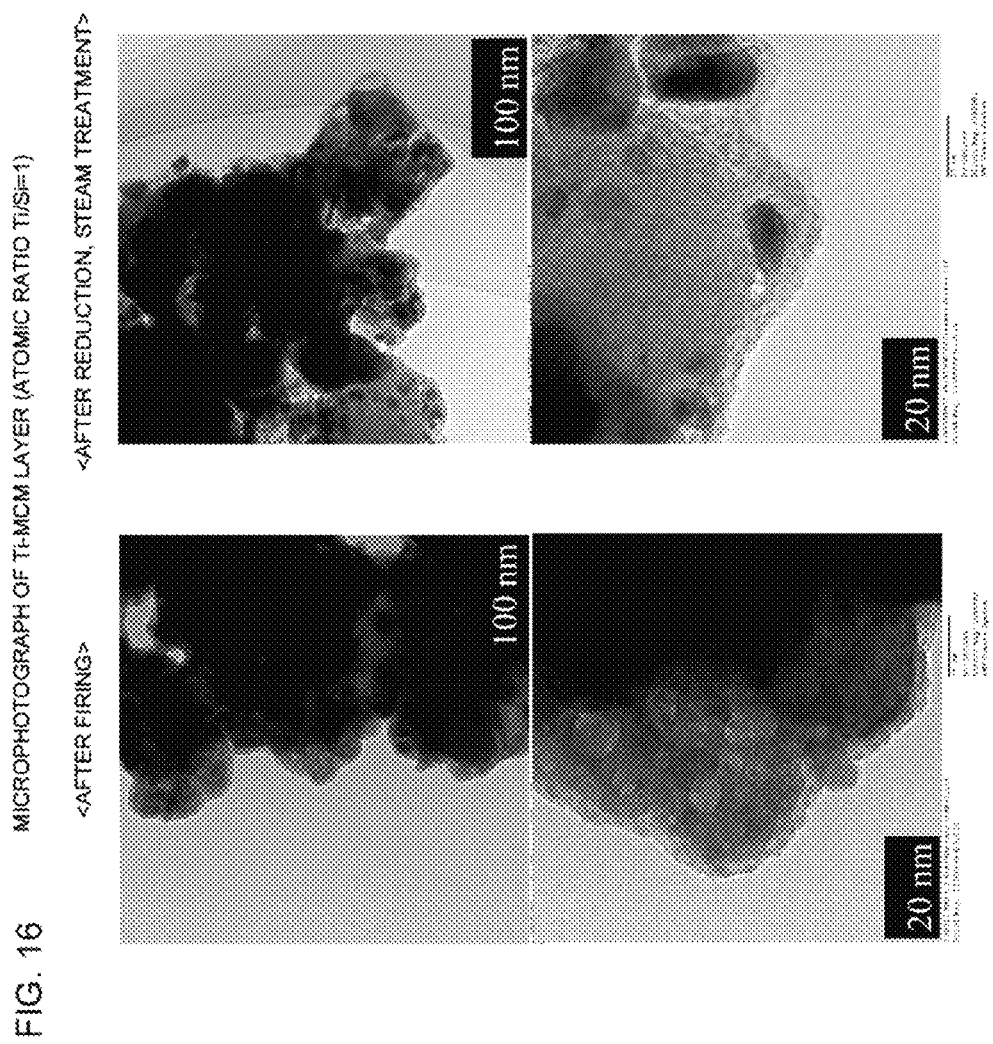
FIG. 16 shows microphotographs about a Ti-MCM layer (atomic ratio Ti/Si=1) before and after steam treatment.

As shown by the microphotograph of FIG. 15, for the catalyst whose atomic ratio Ti/Si was 0.1, the Ti-MCM layer partially collapsed due to the steam treatment. On the other hand, as shown by the microphotograph of FIG. 16, for the catalyst whose atomic ratio Ti/Si was 1, collapse of the Ti-MCM layer due to the steam treatment was hardly observed.

14. Evaluation of Steam Resistance Properties of La-MCM Layer

Figure 17:
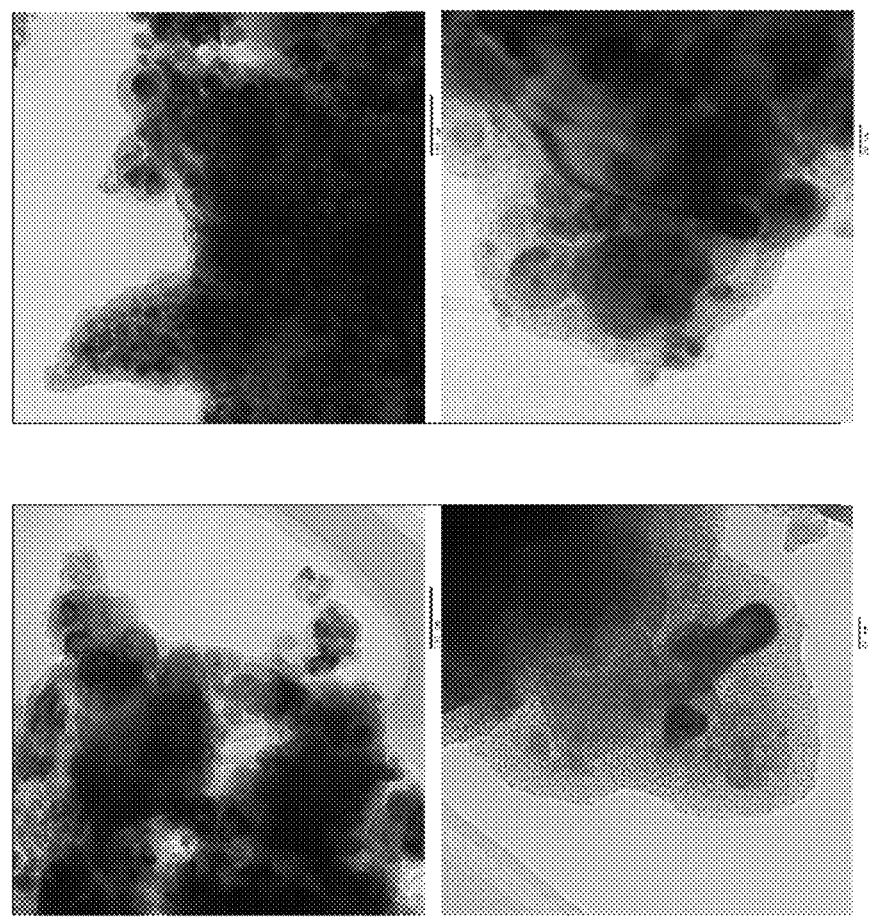
FIG. 17 shows microphotographs about a La-MCM layer (atomic ratio La/Si=0.05) before and after steam treatment.

First, a Ti-MCM/30 wt % Ni/Al-VOx catalyst powder was prepared using a method similar to that of Preparation Example 2. Then, 5 g of this catalyst powder was added to 50 g of extra-pure water to obtain a suspension. Also, 0.12 g of lanthanum nitrate hexahydrate (manufactured by Kanto Chemical Co., Inc.) was dissolved in 10 g of extra-pure water to obtain an aqueous solution. The aqueous solution was then added dropwise to the suspension, then stirred for 1 h, evaporated to dryness at 35° C. using an evaporator, dried at 110° C. for 12 h, and then fired at 500° C. for 3 h to give a catalyst having a La-MCM layer (atomic ratio La/Si=0.05). Then, the prepared catalyst was treated with steam using a method similar to that of "13. Evaluation of Steam Resistance Properties of Ti-MCM Layer," and microphotographs of the catalyst before and after the steam treatment were taken. The results are shown in FIG. 17. As shown in FIG. 17, collapse of the La-MCM layer due to the steam treatment was hardly observed. Further, the BET specific surface areas before and after the steam treatment were measured and found to be 56 $m^2/g$ and 59 $m^2/g$, respectively. That is, the specific surface area did not decrease. These results also reveal that the La-MCM layer did not collapse.

15. Evaluation of Steam Resistance Properties of Zr-MCM Layer

First, a Ti-MCM/30 wt % Ni/Al-VOx catalyst powder was prepared using a method similar to that of Preparation Example 2. Then, 5 g of this catalyst powder was added to 50 g of extra-pure water to obtain a suspension. Also, 0.07 g of zirconium nitrate dihydrate (manufactured by Kanto Chemical Co., Inc.) was dissolved in 10 g of extra-pure water to obtain an aqueous solution. The aqueous solution was then added dropwise to the suspension, then stirred for 1 h, evaporated to dryness at 35° C. using an evaporator, dried at 110° C. for 12 h, and then fired at 500° C. for 3 h to give a catalyst having a Zr-MCM layer (atomic ratio Zr/Si=0.05). The prepared catalyst was treated with steam using a method similar to that of "13. Evaluation of Steam Resistance Properties of Ti-MCM Layer," and microphotographs of the catalyst before and after the steam treatment were taken. The results are shown in FIG. 18. As shown in FIG. 18, collapse of the Zr-MCM layer due to the steam treatment was hardly observed. Further, the BET specific surface areas before and after the steam treatment were measured and found to be 63 $m^2/g$ and 65 $m^2/g$, respectively. That is, the specific surface area did not decrease. These results also reveal that the Zr-MCM layer did not collapse.

The invention claimed is:

1. A selective CO methanation catalyst comprising:
   a supported metal catalyst which selectively methanizes CO in a hydrogen-rich gas containing CO and $CO_2$; and
   a coating layer which covers a surface of the supported metal catalyst, has many pores, and is configured to reduce a CO concentration on the surface of the supported metal catalyst,
   wherein the supported metal catalyst comprises an active metal, and
   wherein the active metal is dispersed on an outer surface of the supported metal catalyst.

2. The catalyst of claim 1, wherein the pores are sized so that a CO diffusion velocity in the pores is lower than a CO methanation velocity on the surface of the supported metal catalyst and thus the CO concentration is reduced as the supported metal catalyst is approached.

3. The catalyst of claim 1, wherein the coating layer further comprises a coating layer-metal having a CO methanation function, the coating layer-metal is supported in the coating layer, and thus the CO concentration is reduced as the supported metal catalyst is approached.

4. The catalyst of claim 3, wherein the coating layer-metal contains Ni.

5. The catalyst of claim 4, wherein the coating layer-metal further contains at least one modified metal selected from Cu, Mg, and Fe.

6. The catalyst of claim 5, wherein the modified metal contains Fe.

7. The catalyst of claim 5, wherein an atomic ratio of the modified metal to Ni is 0.01 to 1.

8. The catalyst of claim 1, wherein the pores are oriented perpendicular to the surface of the supported metal catalyst.

9. The catalyst of claim 1, wherein the coating layer is 5 to 200 nm in thickness, and wherein the pores are 0.5 to 100 nm in diameter.

10. The catalyst of claim 1, wherein the coating layer is made of mesoporous silica.

11. The catalyst of claim 10, wherein the mesoporous silica contains at least one added metal selected from Ti, La, and Zr; and
   wherein an atomic ratio of the added metal to Si is 0.001 to 3.

12. The catalyst of claim 1, wherein a carrier for the supported metal catalyst is an Al oxide containing a V oxide; and wherein an active metal of the supported metal catalyst is Ni or an alloy or mixture of Ni and V.

13. The catalyst of claim 1, wherein a catalyst layer is formed by applying the supported metal catalyst to a honeycomb substrate; and
    wherein the coating layer covers the catalyst layer.

14. A selective CO methanation catalyst for selectively methanizing CO in a hydrogen-rich gas containing CO and $CO_2$, the catalyst comprising:
    a carrier formed of mesoporous silica; and
    a catalyst supported on the carrier and containing Ni and Fe,
    wherein an atomic ratio of Fe to Ni is 0.01 to 1.

15. The catalyst of claim 14, wherein the mesoporous silica contains at least one added metal selected from Ti, La, and Zr; and
    wherein an atomic ratio of the added metal to Si is 0.001 to 3.

16. A selective CO methanation catalyst, comprising:
    a supported metal catalyst which selectively methanizes CO in a hydrogen-rich gas containing CO and $CO_2$;
    a coating layer which covers a surface of the supported metal catalyst, has many pores, and is configured to reduce a CO concentration on the surface of the supported metal catalyst;
    wherein the coating layer further comprises a coating layer-metal having a CO methanation function, the coating layer-metal is supported in the coating layer, and thus the CO concentration is reduced as the supported metal catalyst is approached;
    wherein the coating layer-metal further contains at least one modified metal selected from Cu, Mg, and Fe; and
    wherein an atomic ratio of the modified metal to Ni is 0.01 to 1.

17. The selective CO methanation catalyst of claim 16, wherein the pores are sized so that a CO diffusion velocity in the pores is lower than a CO methanation velocity on the surface of the supported metal catalyst and thus the CO concentration is reduced as the supported metal catalyst is approached.

18. The selective CO methanation catalyst of claim 17, wherein the coating layer-metal contains Ni.

19. The selective CO methanation catalyst of claim 18, wherein the modified metal contains Fe.

20. The selective CO methanation catalyst of claim 19, wherein the pores are oriented perpendicular to the surface of the supported metal catalyst.

* * * * *